US008510046B2

(12) United States Patent
Kabel et al.

(10) Patent No.: US 8,510,046 B2
(45) Date of Patent: Aug. 13, 2013

(54) MARINE VESSEL NAVIGATION DEVICE, SYSTEM AND METHOD

(75) Inventors: Darrin W. Kabel, Overland Park, KS (US); Darren E. Hain, Spring Hill, KS (US); Brayden S. Wilbeck, Olathe, KS (US); Christopher B. Bilderback, Olathe, KS (US)

(73) Assignee: Garmin Switzerland GmbH (CH)

( * ) Notice: Subject to any disclaimer, the term of this patent is extended or adjusted under 35 U.S.C. 154(b) by 0 days.

(21) Appl. No.: 13/560,669

(22) Filed: Jul. 27, 2012

(65) Prior Publication Data
US 2012/0290200 A1    Nov. 15, 2012

Related U.S. Application Data

(63) Continuation of application No. 11/801,138, filed on May 9, 2007, now Pat. No. 8,296,001.

(60) Provisional application No. 60/865,599, filed on Nov. 13, 2006.

(51) Int. Cl.
*G01C 21/34*    (2006.01)
*G08G 1/123*    (2006.01)

(52) U.S. Cl.
USPC ........... 701/532; 701/412; 701/410; 701/409; 340/990; 340/995.1; 342/352; 342/357.21; 342/385

(58) Field of Classification Search
USPC ............ 701/300–301, 408, 532, 412, 410, 701/409; 703/538, 431; 340/984–985, 988, 340/990, 995.1; 318/588; 342/352, 385, 342/357.21
See application file for complete search history.

(56) References Cited

U.S. PATENT DOCUMENTS

| | | | | |
|---|---|---|---|---|
| 4,939,661 A * | 7/1990 | Barker et al. | ................. | 701/455 |
| 6,273,771 B1 * | 8/2001 | Buckley et al. | ................. | 440/84 |
| 6,289,277 B1 | 9/2001 | Feyereisen et al. | ........... | 701/202 |
| 6,381,538 B1 * | 4/2002 | Robinson et al. | ............. | 701/439 |
| 6,799,115 B1 * | 9/2004 | Childs et al. | ................. | 701/532 |
| 6,801,855 B1 * | 10/2004 | Walters et al. | ................ | 701/410 |
| 6,816,782 B1 * | 11/2004 | Walters et al. | ................ | 701/426 |
| 6,859,691 B2 * | 2/2005 | Puchkoff | ........................ | 701/21 |
| 6,862,501 B2 * | 3/2005 | He | ................. | 701/3 |
| 6,885,919 B1 * | 4/2005 | Wyant et al. | .................... | 701/21 |
| 7,035,166 B2 * | 4/2006 | Zimmerman et al. | .......... | 367/88 |
| 7,047,114 B1 * | 5/2006 | Rogers | ............................ | 701/21 |
| 7,209,829 B2 * | 4/2007 | Litvack et al. | ................ | 701/533 |
| 7,268,703 B1 * | 9/2007 | Kabel et al. | ................... | 340/984 |

(Continued)

OTHER PUBLICATIONS

GPS based marine communicator; McFarlane, G.A.; Skobla, J.; Aerospace Conference, 2004. Proceedings. 2004 IEEE vol. 3; Digital Object Identifier: 10.1109/AERO.2004.1367930; Publication Year: 2004.*

(Continued)

*Primary Examiner* — Cuong H Nguyen
(74) *Attorney, Agent, or Firm* — Samuel M. Korte; Mohammad M. Ali

(57) ABSTRACT

A marine electronic device such as a chartplotter which includes a display; a location determining component; and a processing system for receiving location data from the location determining component and for causing information to be displayed by display. The processing system causes the display to display information which assists an operator in navigating and ascertaining characteristics of bodies of water, objects on nearby shores, and other vessels.

9 Claims, 18 Drawing Sheets

(56) References Cited

U.S. PATENT DOCUMENTS

| | | | | |
|---|---|---|---|---|
| 7,308,357 | B2* | 12/2007 | Jones | 701/487 |
| 7,386,392 | B1* | 6/2008 | Kabel et al. | 701/412 |
| 7,516,011 | B1* | 4/2009 | Kabel et al. | 701/415 |
| 8,296,001 | B1* | 10/2012 | Kabel et al. | 701/21 |
| 2002/0169527 | A1* | 11/2002 | Cline | 701/21 |
| 2004/0113783 | A1* | 6/2004 | Yagesh | 340/568.1 |
| 2004/0153222 | A1* | 8/2004 | Puchkoff | 701/21 |
| 2006/0064242 | A1* | 3/2006 | Litvack et al. | 701/202 |
| 2007/0048084 | A1* | 3/2007 | Jung et al. | 404/9 |
| 2008/0065317 | A1* | 3/2008 | Jones | 701/200 |
| 2009/0005961 | A1* | 1/2009 | Grabowski et al. | 701/200 |

OTHER PUBLICATIONS

Kalman filter based team navigation for Multiple Unmanned Marine Vehicles; Schneider, M. et al, Control Applications, 2008. CCA 2008. IEEE International Conf.; Digital Object Identifier: 10.1109/CCA. 2008.4629655; Publication Year: 2008 , pp. 565-570.*

Monitoring Sea Level by Radar Altimeter and CGPS in the North-Western Mediterranean; Martinez-Benjamin et al.; Geoscience and Remote Sensing Symposium, 2008. IGARSS 2008. IEEE Inter. ;vol. 3; Digital Object Identifier: 10.1109/IGARSS.2008.4779413; Publication Year: 2008 , pp. III-577-III-580.*

Next generation marine precision navigation system; Rice, H.; Mendelsohn, L.; Aarons, R.; Mazzola, D.; Position Location and Navigation Symposium, IEEE 2000; Digital Object Identifier: 10.1109/PLANS.2000.838303; Publication Year: 2000 , pp. 200-206.*

Differential GPS dynamic location experiments at sea; Pikander, M.; Eskelinen, P.; Aerospace and Electronic Systems Magazine, IEEE; vol. 19 , Issue: 4; Digital Object Identifier: 10.1109/MAES.2004. 1301773; Publication Year: 2004 , pp. 36-39.*

GNSS—A users' perspective in 2010; Broughton, D; Electronics in Marine, 2004. Proceedings Elmar 2004. 46th International Symposium; Publication Year: 2004 , pp. 1-4.*

Robust position and heading sensor for high speed military vessels; Godhavn, J.-M.; OCEANS '99 MTS/IEEE. Riding the Crest into the 21st Century; vol. 1; Digital Object Identifier: 10.1109/OCEANS. 1999.799705; Publication Year: 1999 , pp. 46-51 vol. 1.*

Developing a low-cost GPS receiver for marine applications; Curry, T.; Cassidy, F.; Position Location and Navigation Symposium, 1988. Record. Navigation into the 21st Century. IEEE Plans '88., IEEE; Digital Object Identifier: 10.1109/PLANS.1988.195524 Publication Year: 1988 , pp. 492-498.*

Using GPS at sea to determine the range between a moving ship and a drifting buoy to centimeter-level accuracy Doutt, J.A.; Frisk, G.V.; Martell, H.; OCEANS '98 Conference Proc., vol. 3; Digital Object Identifier: 10.1109/OCEANS.1998.726287; Pub. Yr. 1998 , pp. 1344-1347 vol. 3.*

Status of marine high-precision GPS navigation system; Welshe, R.G. et al.; Position Location and Navigation Symposium, 1992. Record. 500 Years After Columbus—Navigation Challenges of Tomorrow. IEEE PLANS '92., IEEE; Digital Object Identifier: 10.1109/PLANS.1992.185873; Pub. Year: 1992 , pp. 392-397.*

C-Series Display Reference Manual, Raymarine UK, Mar. 2006.

GPSMAP 3006C/3010C Color Chartplotter, Garmin Ltd., 2004.

GPSMAP 392/398/492/498 Chartplotting Receiver Owner's Manual, Garmin Ltd., 2006.

Printout from http://www.raymarine.com/raymarine/ProductDetail. asp?site=1&section=2&page=758&product_id=1672 , 4 pages, printed May 14, 2007.

Printout from http://www.raymarine.com/raymarine/ProductDetail. asp?site=1&section=2&page=758&product_id=1677 , 4 pages, printed May 14, 2007.

Printout from http://www.raymarine.com/raymarine/Default. asp?site=1&SECTion=2&Page=1007&Parent=2 , 2 pages, printed May 14, 2007.

Printout from http://www.furuno.com/Furuno/Rooms/ DisplayPages/LayoutInitial?Product=com.webridge.entity. Entity%5BOID%5BD15629EF9B3E754688BC95B27B365BA 8%5D%5D&Container=com.webridge.entity. Entity%5BOID%5BFCEADA686AD2AD4FB58C425C51CBAD 62%5D%5D , 2 pages, printed May 14, 2007.

GlobalMap® 3600C iGPS Mapping GPS Receiver Operation Instructions, Lowrance Electronics, Inc. 2006.

Printout from http://www.lowrance.com/Products/Marine/ M68CSMap.asp , 2 pages, printed May 14, 2007.

Printout from http://www.humminbird.com/products.asp?id=638, 2 pages, printed May 14, 2007.

U.S. Appl. No. 11/746,922 entitled Methods, Systems, and Devices for Condition Specific Alerts, filed May 10, 2007.

* cited by examiner

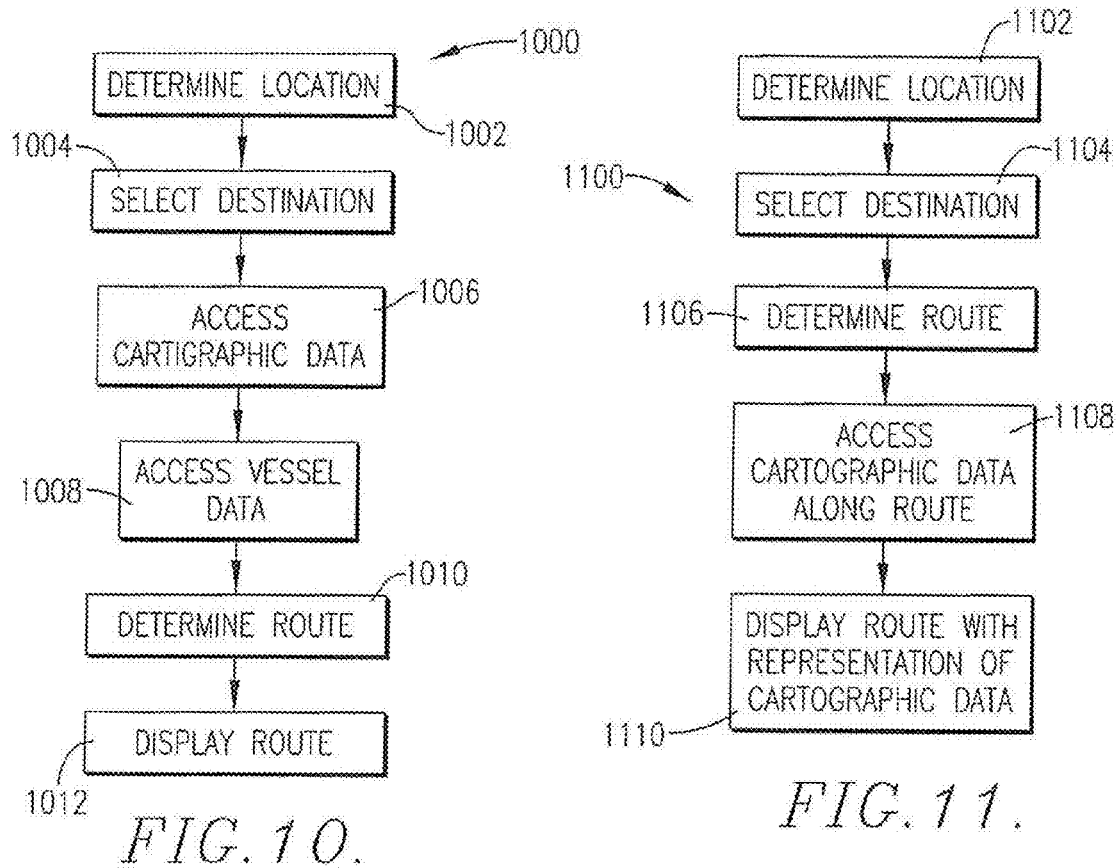
FIG.10.
FIG.11.
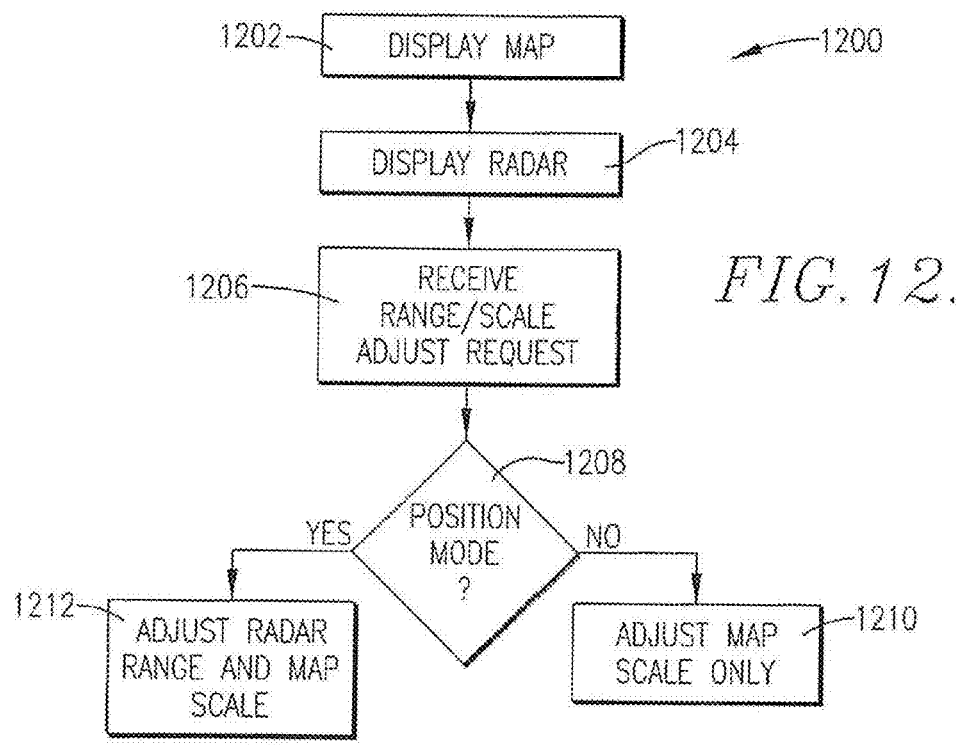
FIG.12.

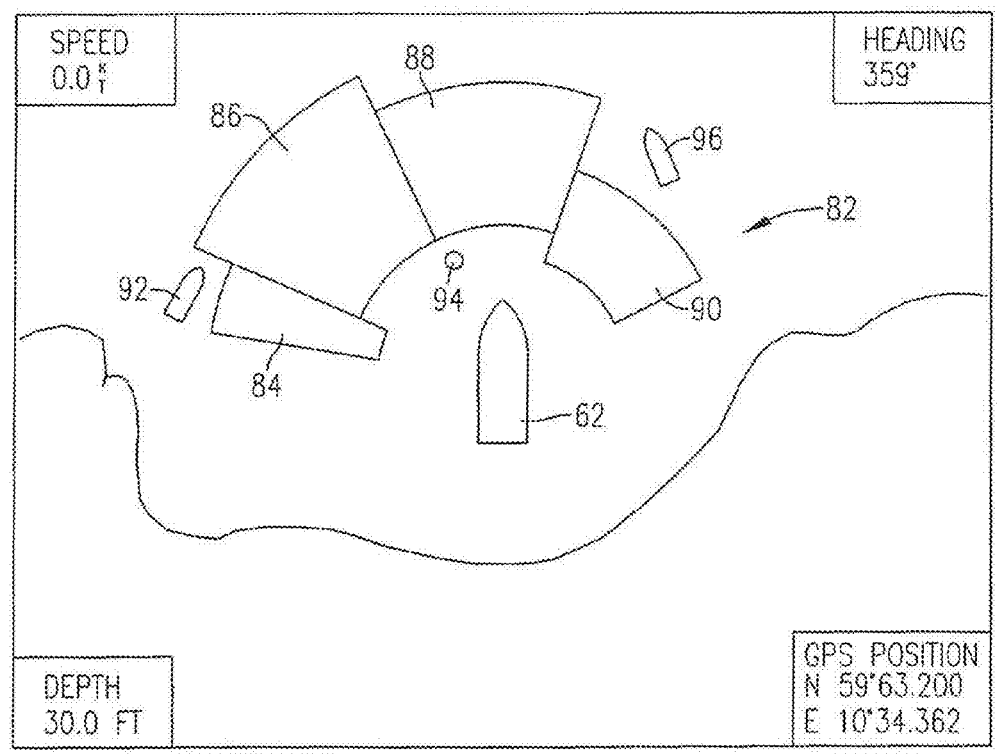
FIG.39.
FIG.40.
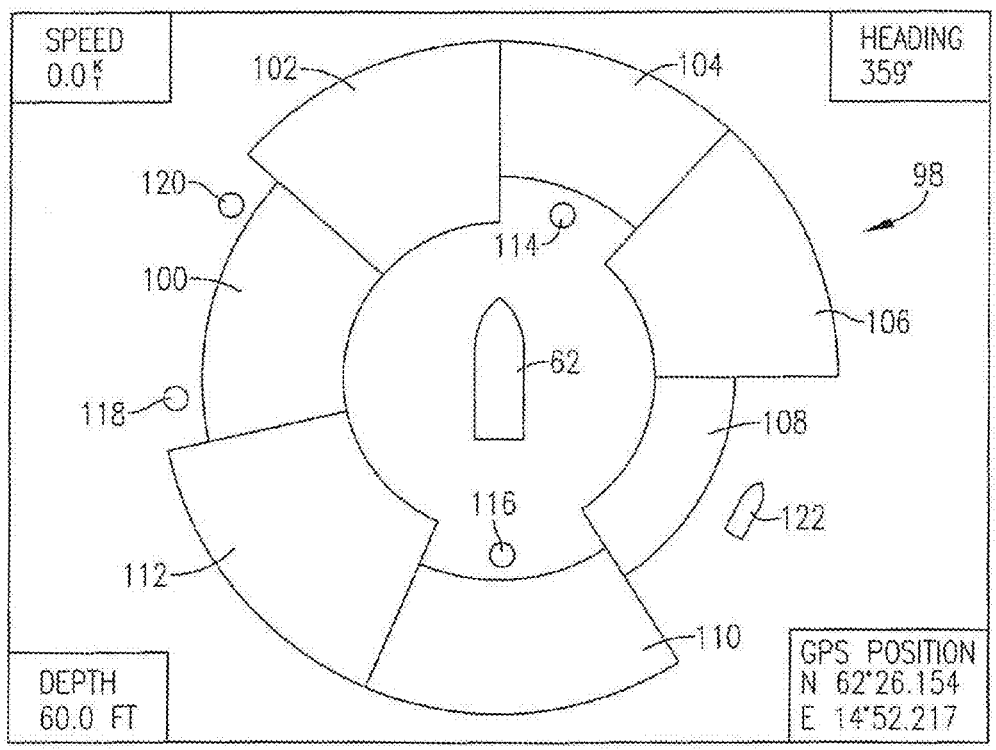

MARINE VESSEL NAVIGATION DEVICE, SYSTEM AND METHOD

CROSS-REFERENCE TO RELATED APPLICATIONS

The present application is a continuation of, and claims priority benefit to, co-pending and commonly assigned U.S. patent application entitled "MARINE VESSEL NAVIGATION DEVICE, SYSTEM AND METHOD," application Ser. No. 11/801,138, filed May 9, 2007, which in turn claims the benefit, under 35 U.S.C. §119(e), of U.S. Provisional Application No. 60/865,599, entitled "SYSTEM AND METHOD FOR MARINE AUTO-GUIDANCE," filed Nov. 13, 2006. Each of the above-identified applications is incorporated herein by reference in its entirety.

BACKGROUND

1. Field

The present invention relates to marine electronic devices such as chartplotters and the like, and, more particularly, to improved devices, systems and methods for displaying navigation-related information on a chartplotter or other marine electronic device.

2. Description of the Related Art

Chartplotters and other marine electronic devices are commonly used by boaters to view cartographic maps of bodies of water and nearby shorelines, navigate to desired locations, and locate fish and other underwater objects. Unfortunately, existing chartplotters and other marine electronic devices often display navigational-related information and other information in such a way that makes it difficult to read, use, and/or interpret.

SUMMARY

The present invention is directed to improved devices, systems and methods for displaying navigation-related information on chartplotters and other marine electronic devices. In exemplary embodiments, the present invention is directed to a marine electronic device such as a chartplotter, or the like, which includes a display; a location determining component; and a processing system for receiving location data from the location determining component and for controlling the display so that information may be displayed by the display. The processing system is operable for causing the display to display a first indicator which shows a desired route to a destination and a second indicator which provides guidance for the desired route. The first indicator may be, for example, a line shown between an origination point of the vessel and the desired destination. The second indicator may be, for example, an arrow or other pointer which points from the current location of the vessel to a point along the desired route. The processing system may cause the display to display the second indicator when the vessel is a pre-determined distance from the desired route and/or when the current heading of the vessel deviates from the desired bearing by a pre-determined amount. Thus, the second indicator prompts the operator to guide the vessel back to a point along the desired route whenever the vessel veers off course.

In another embodiment, the processing system is operable for causing the display to display a lane which indicates a desired route between an origination point and a destination. The lane has boundaries which indicate acceptable and non-acceptable course deviations from the desired route. The width of the lane may be selected by an operator or may be automatically determined based on vessel data such as the current speed, heading, or turning radius of the vessel. The use of a lane with boundaries to designate a desired route accommodates for minor drifting, turning, or other course deviations which are expected for marine vessels. As with the previous embodiment, the processing system may also cause the display to display a guidance indicator, such as an arrow, to guide the vessel back within the lane whenever the vessel veers off course.

In another embodiment, the processing system is operable for determining a route between an origination point and a destination based on cartographic data and vessel data. The cartographic data may be water depth data and/or coordinate data of obstructions on or near the route. The vessel data may be a current speed or heading of the vessel, a turning radius of the vessel, a minimum safe water depth for the vessel, a minimum safe distance from obstructions, and/or a fuel level of the vessel. In one example, the processing system may select a route by considering the minimum safe water depth of the vessel and water depth information between the origination point and the destination and then picking a route which has adequate water depth along all points along the route. By considering both cartographic data and vessel data, the processing system determines an efficient and safe route to follow between the origination point and the destination for a particular vessel.

In another embodiment, the processing system is operable for calculating a route between an origination point and a desired destination and for displaying a route representation which provides cartographic information about points along the route. For example, the displayed route representation may have different segments with varying line thicknesses to indicate cartographic information along the route (relatively thicker segments may indicate shallow water, the presence of obstructions, or the like, while relatively thinner segments may indicate deeper water and the lack of obstructions). Instead of or in addition to the varying line thicknesses, the displayed route representation may have segments of different colors to indicate different cartographic information (a first color may indicate shallow water, a second color may indicate deep water, and a third color may indicate the presence of obstructions along the route).

The processing system may also display a route in such a way as to indicate the confidence or accuracy of the route. For example, if the processing system has enough data about obstructions, water depth, and other criteria to suggest a route with great confidence or accuracy, the route may be displayed in green or with solid lines. Conversely, if the processing system does not have access to enough data to suggest a route with great confidence or accuracy, the route may be shown in yellow, red, or in dashed lines. Any colors, line variations, or the like, may be used to indicate the confidence or accuracy of a displayed route.

In another embodiment, the processing system is operable for causing the display to display a marine map and a radar image overlaid on the map. The marine electronic device of this embodiment also includes a single control (e.g., a dedicated button, touch-screen menu item, etc.) which adjusts both the scale of the map and the range of the radar image. The single control eliminates the need for two separate scale and range controls. In one embodiment, the single range/scale control simultaneously adjusts the radar range and the map scale when the vessel position marker is centered on the display but only adjusts the map scale when the vessel position marker is not centered in the display (for example, when panning the map).

In another embodiment, the processing system is operable for causing the display to display an icon or other marker shaped like a boat to mark the current position of the marine vessel. The boat icon may include red, green, and white colored portions in a manner consistent with the required lighting requirements of real vessels so that the orientation of the vessel may be quickly determined by viewing the boat icon on the map. For example, the boat icon may include a red segment on the port/bow portion of the icon, a green segment on the starboard/bow portion of the icon, and a white segment on the rear portion of the icon. Current location markers for other nearby vessels may also include portions having red, green, and white colors. General shading of markers for other vessels may be used to indicate the threat level associated with the other vessel (e.g. how close the other vessel is to the operator's vessel). For example, a marker with a generally green hue may indicate another vessel which is not a threat whereas a marker with a generally red hue may indicate another vessel which is a threat because it is too close or is on an intercept heading.

In another embodiment, the processing system is operable for displaying a three-dimensional (3D) map and for displaying three-dimensional representations of certain auxiliary information on the map. For example, the processing system may display range rings on the map to more effectively place the boat icon or other boat marker on the water displayed on the map. The range rings concentrically encircle the boat icon and tie it to the map so the boat appears to be floating on the water rather than floating above the water. The processing system may also display three-dimensional representations of objects detected by marine surface radar such as buoys, lights, and other vessels; three-dimensional representations of real-time weather data; and three-dimensional representations of bridges, towers, and other landmarks and markers.

In another embodiment, the processing system is operable for displaying water depth representations on a map so that the water depth at various locations can be quickly ascertained. For example, deep water may be shown in a first color (e.g., blue) and shallow water may be shown in a second color (e.g., red). Additionally, the water depth representations may be based on a minimum safe water depth for a marine vessel. For example, if the minimum safe depth for a vessel is 10 ft., all water that is deeper than 10 ft. may be shown in the first color (blue) and all water shallower than 10 ft. may be shown in the second color (red). In other embodiments, multiple colors, or color blends, may be used to designate different water depth ranges. For example, for a minimum safe water depth of 10 ft., water that is deeper than 30 ft. may be shown in a first color (e.g., blue), water that is shallower than 10 ft. may be shown in a second color (e.g., red), and water that is between 10 ft. and 30 ft. deep may be shown in a blend of the first color and the second color (e.g., a red-blue blend). The transition from one color to another may also be done smoothly (rather than in discrete steps) so that minor differences in water depth may be identified. For example, for a minimum safe depth of 10 ft., water that is deeper than 30 ft. may be shown in a solid first color (e.g., blue), water that is shallower than 10 ft. may be shown in a solid second color (e.g., red), and water depths between 10 ft. and 30 ft. may be shown in a blend of the first color and the second color (e.g., a red-blue blend), wherein the amount of each color in the blend varies proportionally with the water depth. In this example, a water depth of 11 ft. may be shown with a color blend of 95% of the second color (red) and 5% of the first color (blue); a water depth of 20 ft. may be shown with a color blend of 50% of the first color (red) and 50% of the second color (blue); and a water depth of 29 ft. may be shown with a color blend of 5% of the second color (red) and 95% of the first color (blue).

In another embodiment, the processing system is operable for causing the display to display a three-dimensional (3D) map page and for determining an optimal vertical exaggeration factor for the 3D map page. The processing system uses a variable exaggeration for each point on the terrain triangle mesh using two factors. The first is that elevation exaggeration for each point varies with distance from the elevation of the water surface. Elevations near the water surface are exaggerated less than elevations farther away from the water surface. The second is that points that fall within the water areas cannot have elevations greater than the water surface. The reason behind these two methods is to prevent water areas drawing at higher elevations than they should due to differences between our elevation data and water area data.

In another embodiment, the processing system is operable for smoothly adjusting both the camera position and camera angle of the three-dimensional map display. The camera position and camera angle may be adjusted in such a way as to maintain the current position marker for the vessel in the same area on the display as the camera position and camera angle are changed. The user adjusts the camera position and the processing system then automatically adjusts the camera angle so that the point of focus (the vessel or the bottom under the vessel) is always placed in the same area of the screen. This feature may be provided for both aerial views and underwater views.

The processing system also provides a unique point scaling technique. Prior art chartplotters draw points like buoys and wrecks so that they do not get smaller the farther away they are from the camera (perspective is not applied). The present invention provides two techniques for determining point drawing size that varies with camera position. When the camera is at its lowest position (directly behind the boat looking forward), points are drawn so that they do get smaller the farther they are from the camera. The processing system limits the maximum size of the points. For example, as a buoy approaches from the distance it will gradually become larger the closer it gets to the camera. Instead of eventually being drawn very large and filling the screen when it is very close to the camera (as would happen with normal perspective), the point is drawn at a maximum size when it reaches a certain distance from the camera. This naturally reduces the clutter of points and gives emphasis to the most important points close to the vessel. When the camera is at its highest position (directly above the boat looking down), points are drawn so that they are all the same size. The points are not scaled for size with distance from the camera. This camera position gives an overview of the area surrounding the vessel. As the camera position moves from one position extreme to the other, the point scaling smoothly interpolates between the two methods.

In another embodiment, the marine electronic device further includes, or is connected to, a sonar sounder and a sonar transducer. The processing system is operable for receiving two-dimensional sonar data from the sonar sounder and for realistically rendering it on an underwater three-dimensional map page. Multiple sonar panels, each displayed at the location it was acquired, may be displayed on the underwater map page.

In another embodiment, the processing system is operable for creating a guard zone around a vessel in which the device is used for identifying threats to the vessel (e.g. other boats, buoys, docks, obstructions, etc.). The guard zone can be automatically adjusted to account for nearby objects which are not currently a threat to reduce false alarms and to shift processing power to possible real threats.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

BRIEF DESCRIPTION OF THE DRAWING FIGURES

Embodiments of the present invention are described in detail below with reference to the attached drawing figures, wherein:

FIG. 10 is a flow diagram illustrating selected steps in a method of an embodiment.

FIG. 11 is a flow diagram illustrating selected steps in a method of an embodiment.

FIG. 12 is a flow diagram illustrating selected steps in a method of an embodiment.

FIG. 39 is a schematic diagram depicting an exemplary screen display of the marine electronic device.

FIG. 40 is a schematic diagram depicting an exemplary screen display of the marine electronic device.

Figure 1:
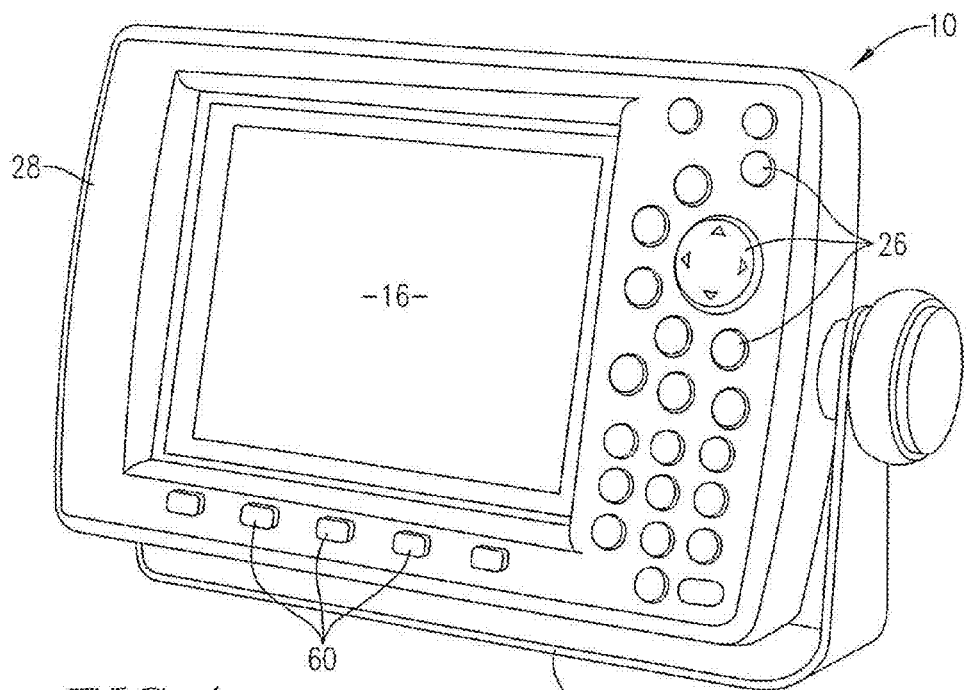
FIG. 1 is a perspective view of an exemplary marine electronic device which may be used to implement certain aspects of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

The present invention can be implemented in hardware, software, firmware, or a combination thereof. In an exemplary embodiment, the invention is implemented with a marine electronic device 10 such as the one illustrated in FIG. 1. The marine electronic device 10 may be any device which provides navigational-related information to operators of marine vessels such as a chartplotter or the like. The marine electronic device 10 and its components illustrated and described herein are merely examples of a device and components that may be used to implement the embodiments of the present invention and may be replaced with other devices and components without departing from the scope of the invention.

Figure 2:
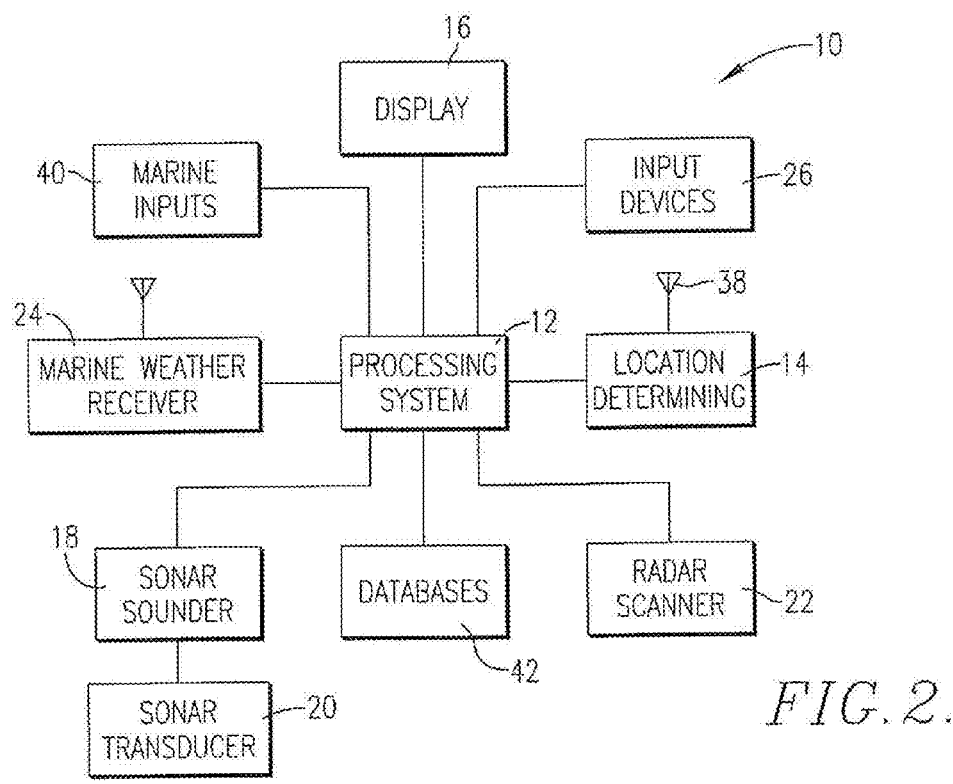
FIG. 2 is a block diagram of selected components of the marine electronic device.

Referring initially to FIGS. 1 and 2, an embodiment of the marine electronic device 10 includes a processing system 12; a location determining component 14; and a display 16. The device 10 may also include an integrated or external sonar sounder 18 coupled with a sonar transducer 20; an integrated or external radar scanner 22; an integrated or external weather receiver 24; one or more input devices 26; a housing 28 which encloses and protects the other components from moisture, vibration, and impact; and other components described below. The device 10 may include mounting hardware 30 for removably securing the device to a surface within a marine vessel or may be configured to be panel-mounted within the vessel.

The processing system 12 may include any number of processors, controllers, or other processing systems and resident or external memory for storing data and other information accessed and/or generated by the device 10. In accordance with one important aspect of the invention, the processing system 12 implements one or more computer programs which control the display of information on the display as described herein. The computer programs may comprise ordered listings of executable instructions for implementing logical functions in the processing system. The computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

Figure 3:
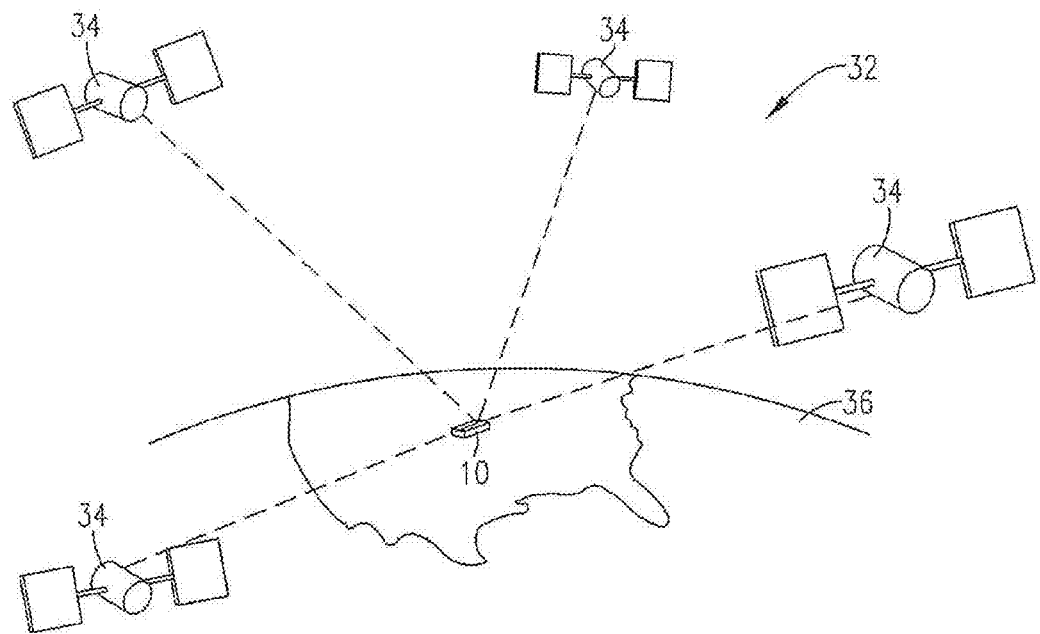
FIG. 3 is schematic diagram of the Global Positioning Satellite (GPS) system.

The location determining component 14 may be a global positioning system (GPS) receiver or any other device which can determine locations of the marine vessel in which the device 10 is used. In general, the GPS is a satellite-based radio navigation system capable of determining continuous position, velocity, time, and direction information for an unlimited number of users. FIG. 3 shows one representative view of a GPS denoted generally by reference numeral 32. A plurality of satellites 34 are in orbit about the Earth 36. The orbit of each satellite is not necessarily synchronous with the orbits of other satellites and, in fact, is likely asynchronous. A GPS receiver device 10 such as the ones described in connection with embodiments of the present invention is shown receiving spread spectrum GPS satellite signals from the various satellites 34.

The spread spectrum signals continuously transmitted from each satellite 34 utilize a highly accurate frequency standard accomplished with an extremely accurate atomic clock. Each satellite 34, as part of its data signal transmission, transmits a data stream indicative of that particular satellite. The device 10 acquires spread spectrum GPS satellite signals from at least three satellites for the GPS receiver device to calculate its two-dimensional position by triangulation.

The location determining component 14 is operable to receive navigational signals from the GPS satellites 34 to calculate a position of the device 10 as a function of the signals. The location determining component 14 is also operable to calculate a route to a desired location, provide instructions to navigate to the desired location, display maps and other information on the display screen, and to execute other functions described herein.

The location determining component 14 may include one or more processors, controllers, or other processing systems and memory or may utilize the components of the processing system 12. The memory of the processing system 12 and/or the location determining component 14 may store cartographic data and routing used by or generated by the location determining component. The memory may be integral with the location determining component 14, integral with the processing system 12 stand-alone memory, or a combination of both. The memory may include, for example, removable microSD cards, or the like.

The location determining component 14 may include an internal or external antenna 38 to assist the location determining component in receiving signals. The antenna may be a removable quad-helix antenna or any other type of antenna that can be used with navigational devices. The antenna may be mounted directly on or in the housing or may be mounted external to the housing.

The display 16 is coupled with the processing system 12 and the location determining component 14 for displaying data and information as described herein. The display 16 may be an LCD display capable of displaying both text and graphical information. The display may be backlit such that it may be viewed in the dark or other low-light environments. As illustrated in FIG. 1, the display 16 may be positioned on a front face of the housing 28 for ease of viewing.

The inputs 26 may also be positioned on the front of the housing 28 such that they may be easily accessed. The inputs 26 may include descriptive markings that identify their function. The inputs may be buttons, switches, keys, an electronic touch-screen associated with the display, voice recognition circuitry, or any other elements capable of controlling the processing system and location determining component.

The sonar sounder 18 may be integrated into the marine electronic device 10 or be an external device such as an external sounder module, or the like. The sonar sounder includes or is coupled with a sonar transducer 20 mounted to or near the bottom of the marine vessel in which the device 10 is used. The sonar sounder may be operated and adjusted using the input devices 26 on the device 10 or using its own controls.

Similarly, the radar scanner 22 may be integrated into the marine electronic device 10 or be an external device such as a marine radar device, or the like. The radar scanner may be operated and adjusted using the input devices 26 on the device 10 or using its own controls.

The marine weather receiver 24 may also be integrated or external. For example, the receiver may be a marine weather satellite Receiver or similar device with an integrated smart antenna or other similar antenna that receives signals for NEXRAD radar imaging, XM Satellite Radio, weather information, and general navigation information. The marine weather receiver 24 may require a subscription to XM WX Weather or similar service for operation.

The device 10 may also include a speaker for providing audible instructions and feedback, a microphone for receiving voice commands, an infrared port for wirelessly receiving and transmitting data and other information from and to nearby electronics, and other information, and even a cellular or other radio transceiver for wirelessly receiving and transmitting data from and to remote devices. For example, the radio transceiver may permit the device 10 to communicate with a remote server.

The device 10 may also include a number of I/O ports that permit data and other information to be transferred to and from the processing system 12 and the location determining component 14. The I/O ports may include removable memory card slot, such as a microSD card slot, or the like for receiving removable memory cards, such as microSD cards, or the like, and an Ethernet port for coupling with an Ethernet cable connected to another processing system such as a personal computer. Navigational software, cartographic maps and other data and information may be loaded in the device 10 via the I/O ports, the wireless transceivers, or the infrared port mentioned above.

The device 10 may also include marine inputs 40 which may be directly or indirectly coupled with sensors or other devices which sense the state of certain aspects of the marine vessel in which the marine electronic device 10 is used. For example, the marine inputs 40 may receive data from sensors which measure or sense fuel level, wind speed, wind direction, temperature, speed, the location of other vessels, or the like. The marine inputs 40 may also be coupled with a compass for determining the vessel's current magnetic heading.

The marine electronic device 10 may also include memory for one or more databases broadly referred to by the numeral 42. The databases may include, for example, information about the marine vessel in which the marine electronic device is used, such as the vessel's length, width, weight, turning radius, top speed, draft, minimum depth clearance, minimum height clearance, and fuel consumption rate. The databases may also include Coast Guard data about locations and types of navigational aids including buoys, markers, lights, or the like.

The housing 28 may be constructed from a suitable lightweight and impact-resistant material such as, for example, plastic, nylon, aluminums, or any combination thereof. The housing may include one or more appropriate gaskets or seals to make it substantially waterproof or resistant. The housing may include a location for a rechargeable battery or other power source. The housing may take any suitable shape or size, and the particular size, weight and configuration of the housing may be changed without departing from the scope of the present invention.

The components shown in FIGS. 1 and 2 and described herein need not be physically connected to one another since wireless communication among the various depicted components is permissible and intended to fall within the scope of the present invention.

The marine electronic device 10 described and illustrated herein is operable for displaying navigation information and other related information in a way that makes the information easier to read, use, and interpret. In one embodiment illustrated in FIGS. 4 through 7, the processing system 12 is operable for causing the display 16 to display first and second indicators 44, 46 for assisting an operator in navigating to a desired destination. The first indicator 44 may represent a desired route to the destination and the second indicator 46 may provide guidance for following the desired route. For example, the first indicator may be a line (FIG. 5) or several line segments (FIG. 6) shown between an origination point of the vessel and the desired destination. However, the first indicator is not limited to a line or line segments, but may be any indicator which marks the desired route. The second indicator may be an arrow or other pointer which points from the current location of the vessel to a point along the desired route; however it may be any other type of indicator which provides guidance onto the desired route. The first and second indicators may be displayed on two-dimensional map pages as depicted in FIGS. 5 and 6 or a three-dimensional map page as depicted in FIG. 7.

Although the second indicator 46 may be displayed at all times, in embodiments, it is only displayed when the processing system 12 determines that the vessel requires guidance. When the second indicator is displayed, it prompts the vessel operator to guide the vessel back to a point along the desired route. For example, as illustrated in FIG. 5, the processing system 12 may cause the second indicator 46 to be displayed when the current heading of the vessel is different than the desired bearing for the route (e.g. the current heading is a pre-determined number of degrees off the desired bearing). The current heading of the vessel may be determined by a magnetic compass, an electronic compass, or the location determining component. The amount which the current heading must vary from the bearing before the second indicator is displayed may be selected by the operator or automatically determined by the processing system 12 based on vessel data described below. To eliminate unnecessary and frequent steering adjustments, the second indicator 46 may only be displayed when the vessel's current heading is at least 3° off the desired heading.

Figure 6:
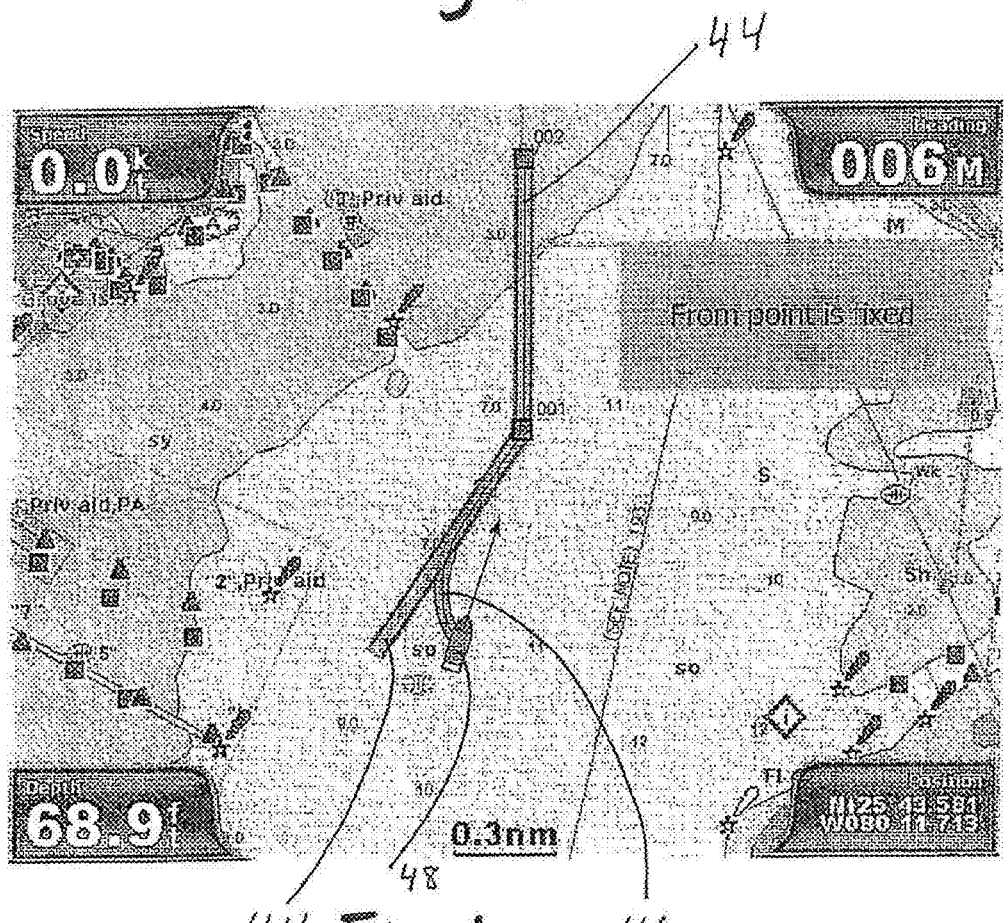
FIG. 6 is an exemplary screen display which may be shown by the marine electronic device.
Figure 7:
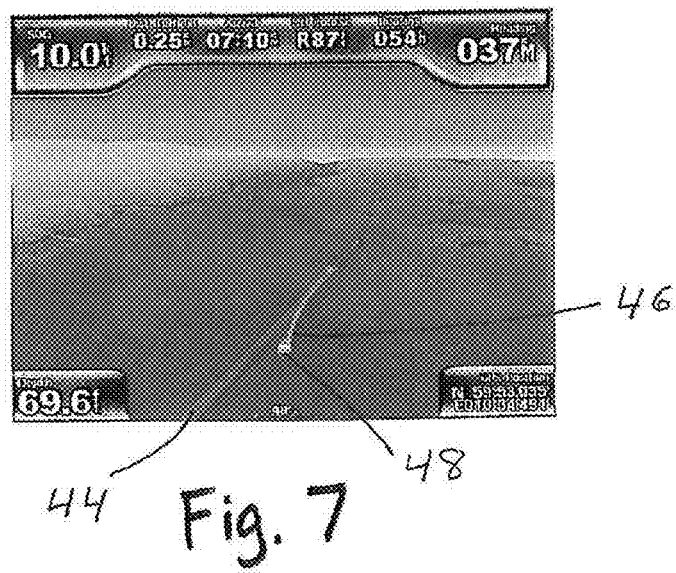
FIG. 7 is an exemplary screen display which may be shown by the marine electronic device.

Alternatively, as illustrated in FIGS. 6 and 7, the processing system 12 may cause the display 16 to display the second indicator 46 when the vessel is a pre-determined distance from the desired route. The pre-determined distance may be selected by the operator or automatically determined by the processing system 12 and, in embodiments, is greater than 500 ft. to eliminate unnecessary course adjustments.

The particular angle and direction of the second indicator 46 may be determined based on a number of factors. For example, the angle and direction of the second indicator 46 may be based on vessel data stored in the databases 42 such as the current speed of the vessel, how far the vessel is off course, the current heading of the vessel, the minimum turning radius of the vessel, the weight of the vessel, the length of the vessel, the width of the vessel, the height of the vessel, the remaining fuel in the vessel, or the draft of the vessel. The processing system 12 may, for example, cause the display 16 to display a second indicator 46 with a relatively small angle relative to the first indicator 44 when the vessel is traveling at a high rate of speed or has a large turning radius so that the vessel is slowly guided back onto the desired route without any sharp or sudden turns. Conversely, if the vessel is traveling at a relatively low rate of speed and/or has a shorter turning radius, the angle between the second indicator 46 and the first indicator 44 may be steeper. The particular angle and direction of the second indicator 46 may also be based on cartographic data stored in the databases 42 such as the presence of obstructions, shallow water, or the like, between the current location of the vessel and the route designated by the first indicator. The processing system 12 may, for example, cause the display 16 to display a second indicator 46 which directs the vessel around an obstruction and then to a point along the route.

Figure 4:
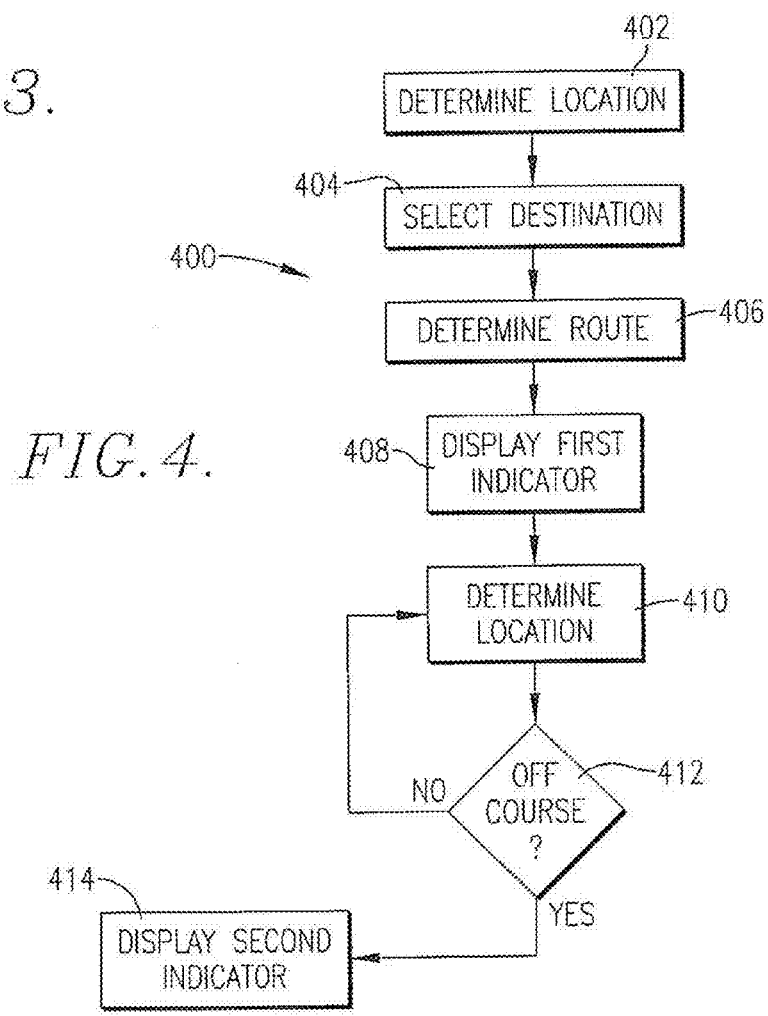
FIG. 4 is a flow diagram illustrating selected steps in a method of an embodiment.
Figure 5:
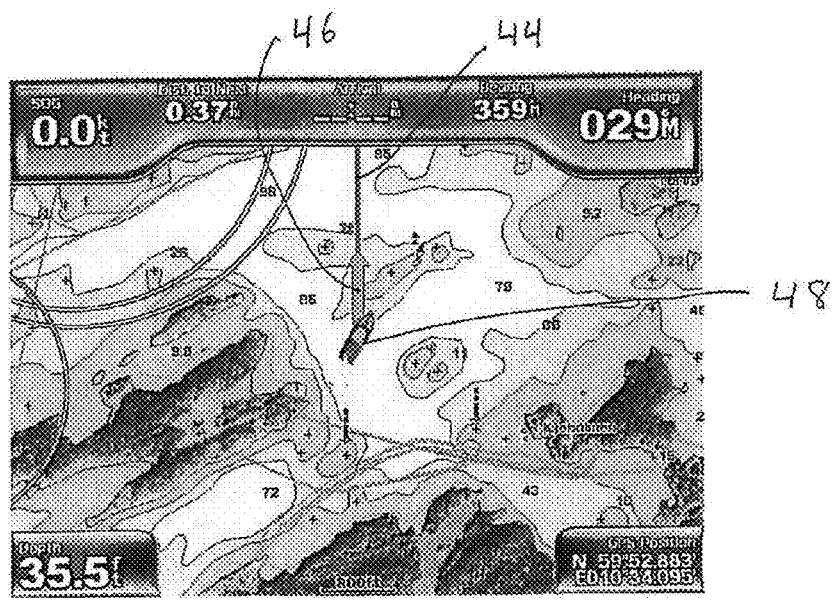
FIG. 5 is an exemplary screen display which may be shown by the marine electronic device.

FIG. 4 illustrates certain steps in an exemplary method 400 of using the marine electronic device 10 in accordance with the embodiments illustrated in FIGS. 5 through 7. The particular order of the steps illustrated in FIG. 4 and described herein can be altered without departing from the scope of the invention. For example, some of the illustrated steps may be reversed, combined, or even removed entirely. In step 402, the processing system 12 determines a current location of the marine vessel in which the device 10 is located by polling the location determining component 14 or by some other method.

This current location is then used as the origination point for a route. An operator of the device 10 then selects and inputs a desired destination into the device in a conventional manner as depicted in step 404. The processing system then determines a route between the origination point and the destination in a conventional manner as depicted in step 406.

The processing system 12 then displays the first indicator 44 between the origination point and the destination as depicted in step 408 and as illustrated in FIGS. 5 through 7. As mentioned above, the first indicator 44 may be a line or series of line segments drawn between the origination point, the destination point, and any intermediate points. The operator of the vessel may follow the desired route by keeping the current location marker 48 for the vessel on or near the first indicator 44.

While the vessel follows the route, the processing system 12 continues to determine the vessel's current location and/or direction of movement as depicted in step 410. Each time a location or direction reading is taken, the processing system 12 compares the vessel's current location to the route indicated by the first indicator 44 to determine if the vessel is off course as depicted in step 412. If the processing system 12 determines that the vessel is off course (i.e. the current heading of the vessel is different from the desired bearing and/or the vessel is a pre-determined distance from the desired route as described above), it displays the second indicator 46 as depicted in step 414 to prompt the operator to guide the vessel back toward the desired route indicated by the first indicator.

Figure 8:
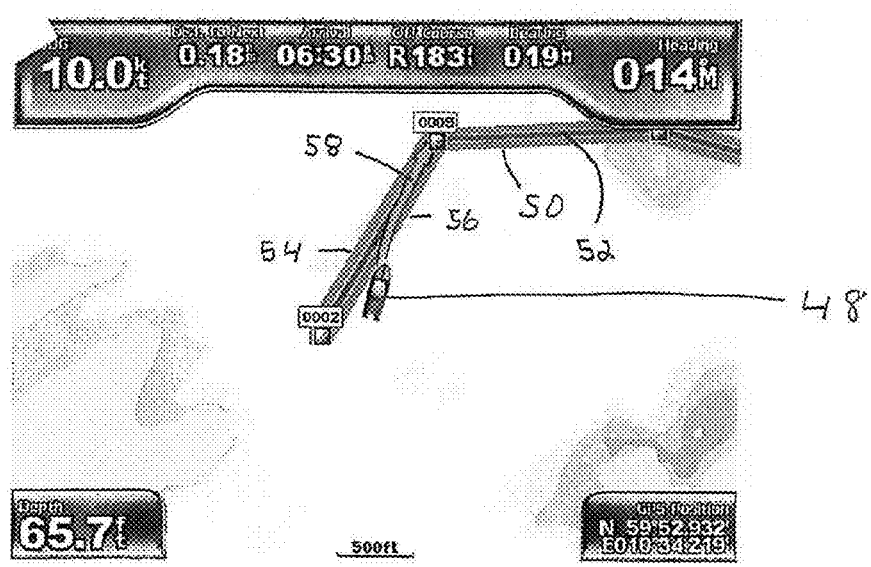
FIG. 8 is an exemplary screen display which may be shown by the marine electronic device.
Figure 9:
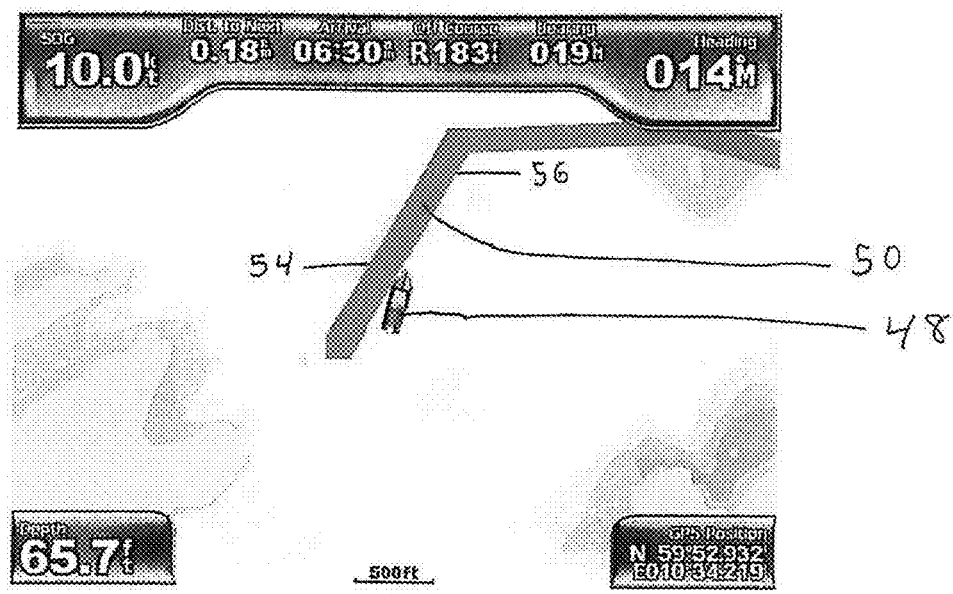
FIG. 9 is an exemplary screen display which may be shown by the marine electronic device.

In another embodiment illustrated in FIGS. 8 and 9, the processing system 12 is operable for displaying a lane 50 which indicates a desired route between an origination point of the vessel and a desired destination. The lane may be provided with a superimposed center line 52 as shown in FIG. 8 or without a center line as shown in FIG. 9. Importantly, the lane 50 marks a relatively wide path that may be followed to stay on the route and has left and right boundaries 54, 56 which indicate acceptable and non-acceptable course deviations from the desired route. The use of a lane with boundaries to designate a desired route accommodates for minor drifting, turning, or other course deviations which are expected for marine vessels.

The width of the lane 50 may be selected by an operator or may be automatically determined based on vessel data such as the current speed of the vessel, the current heading of the vessel, the minimum turning radius of the vessel, the weight of the vessel, the length of the vessel, the width of the vessel, the height of the vessel, and the draft of the vessel. For example, the operator may select a lane width of 400 ft. so that the left and right boundaries 54, 56 are each 200 ft. from the center of the lane. Alternatively, the processing system may automatically select a relatively wide lane width for large and/or fast-moving vessels and a relatively narrower lane width for smaller and/or slower-moving vessels. The processing system 12 may also select a relatively narrow lane when obstructions or shallow water along the desired route necessitates a stricter adherence to the precise route.

Whenever the vessel approaches and/or crosses one of the left or right boundaries 54, 56 of the lane 50 or deviates from the center line by a selected amount, the processing system 12 may cause the display 16 to display an arrow 58 or other indicator prompting the operator to steer the vessel back toward the center of the lane. For example, the processing system 12 may cause the display 16 to display a warning light or turn instruction whenever the vessel is within a pre-determined distance (e.g. 20 ft.) from the left or right boundary 54, 56 and may then display the arrow 58 pointing back toward the center of the lane whenever the vessel moves entirely outside of the lane as shown in FIG. 8. As with the embodiment of FIGS. 4 through 7 described above, the particular angle and direction of the arrow 58 or other indicator may be based on vessel data or cartographic data.

Instead of referencing the left and right boundaries 54, 56, the processing system may cause the display 16 to display an arrow or provide another warning or alert whenever the vessel deviates from the center line 52 of the lane by more than a specified amount. For example, the arrow or other alert or alarm may be provided whenever the vessel is more than 40 ft., 60 ft., 80 ft., 100 ft., or any other specified distance from the center line of the lane.

In another embodiment, the processing system 12 is operable for determining a route between an origination point and a destination based on cartographic data and vessel data. The cartographic data may be, for example, water depth data and/or coordinate data of obstructions on or near the route. The vessel data may be, for example, the current speed of the vessel, the current heading of the vessel, the minimum turning radius of the vessel, the weight of the vessel, the length of the vessel, the width of the vessel, the height of the vessel, the remaining fuel in the vessel, and the draft of the vessel. The vessel data and the cartographic data may be obtained from the databases 42 or from sources external to the device 10. By considering both cartographic data and vessel data, the processing system 12 can determine the most efficient and safe route to follow between the origination point and the destination for a particular vessel.

FIG. 10 illustrates certain steps in an exemplary method 1000 of using the marine electronic device in accordance with the embodiment described in the previous paragraph. The particular order of the steps illustrated in FIG. 10 and described herein can be altered without departing from the scope of the invention. For example, some of the illustrated steps may be reversed, combined, or even removed entirely. The method 1000 begins when the processing system 12 determines a current location of the vessel as depicted in step 1002. This may be done by polling the location determining component 14 or by any other method. An operator then selects and enters a desired destination as depicted in step 1004. The processing system then accesses cartographic data as depicted in step 1006 and vessel data as depicted in step 1008. Both the cartographic data and the vessel data may be stored in and accessed from one of the databases or may be received wirelessly from an external database or other source.

The processing system 12 then determines a route between the current location of the vessel and the desired destination by taking into account both the cartographic data and the vessel data. In one example, the processing system 12 may determine a route based on the vessel's depth clearance and water depth data. Particularly, the processing system may access the vessel data and determine that the minimum depth clearance of the particular vessel in which the device is being used is 10 ft. The processing system then accesses the cartographic data and selects a route which is at least 10 ft. deep along all points thereof.

In another example, the processing system 12 may determine a route based on the vessel's height and the minimum clearance of all known obstructions between the origination point and the desired destination. Particularly, the processing system 12 may access the vessel data and determine that the vessel has a height (including masts) of 30 ft. The processing system 12 then accesses the cartographic data and selects a route with no bridges or other obstructions having a height clearance of less than 30 ft.

In yet another example, the processing system 12 may determine a route based on the vessel's fuel characteristics.

Particularly, the processing system may access the vessel data and determine that the vessel has only 10 gallons of fuel remaining and a fuel consumption rate of 1 gallon per mile. The processing system 12 then accesses the cartographic data and selects a route having a total distance of 10 miles or less. If the minimum safe distance between the current location of the vessel and the destination is greater than 10 miles, the processing system may cause the display 16 to display an error message and/or display directions to the closest marine fuel station.

In another embodiment, the processing system 12 is operable for displaying a route with an indicator that provides cartographic information about points along the route. For example, the processing system may represent a route with a line shown between an origination point and a destination, with the line having segments with varying line thicknesses to indicate water depth along the route. Relatively thicker segments may, for example, indicate shallow water, while relatively thinner segments may indicate deeper water. Similarly, relatively thicker segments may indicate possible obstructions and relatively thinner segments may indicate the lack of obstructions. Instead of or in addition to the varying line thicknesses, the route may be represented with an indicator having different colored segments to indicate different cartographic information. A first color may, for example, indicate shallow water, a second color may indicate deep water, and a third color may indicate the presence of obstructions along the route, or the like.

The processing system 12 may also cause the display 16 to display a route in such a way as to indicate the confidence or accuracy of the route. For example, if the processing system has enough data about obstructions, water depth, and other criteria to suggest a route with great confidence or accuracy, the route may be displayed in green or with solid lines. Conversely, if the processing system does not have access to enough data to suggest a route with great confidence or accuracy, the route may be shown in yellow, red, or in dashed lines. Any colors, line variations, or the like, may be used to indicate the confidence or accuracy of a displayed route.

FIG. 11 illustrates certain steps in an exemplary method 1100 of using the marine electronic device 10 in accordance with the embodiment described in the previous paragraphs. The particular order of the steps illustrated in FIG. 11 and described herein can be altered without departing from the scope of the invention. For example, some of the illustrated steps may be reversed, combined, or even removed entirely. The method 1100 begins when the processing system determines a current location of the vessel as depicted in step 1102. This may be done with the location determining component 14 or by any other method. An operator then selects and enters a desired destination as depicted in step 1104. The processing system 12 then determines a route between the current location and the destination as depicted in step 1106. The processing system next accesses cartographic data from points along the calculated route as depicted in step 1108 and indicates the desired route in such a way as to provide information about the confidence/accuracy of the route and/or the cartographic data along the route as depicted in step 1110. As described above, this may be done with varying line thicknesses, different colors, or any other method and may also be done to indicate confidence in the automatically generated solution.

In another embodiment, the processing system 12 causes the display 16 to display both a marine map and a radar image. The device of this embodiment also includes a single control (such as a dedicated button, touch-screen menu item, etc.) which adjusts both the scale of the map and the range of the radar image synchronously. The single control may be, for example, one of the soft keys 60 illustrated in FIG. 1 or a touch-screen control presented on the display 16. The single control eliminates the need for two separate scale and range controls.

The single range/scale control may simultaneously adjust both the radar range and map scale or adjust only the radar range or the map scale. For example, the processing system 12 may be configured to simultaneously adjust both the radar range and the map scale when the vessel position marker is centered on the display but only adjust the map scale when panning the map so that the vessel position marker is not centered in the display. This is done because the operator is presumably viewing both the radar and the current position of the boat when the vessel position marker is centered on the display and therefore desires to have both the radar range and the map scale simultaneously adjusted. Conversely, the operator is presumably less concerned about the radar when panning the map page away from the current position of the vessel and therefore only desires to adjust the map scale. This latter scenario allows the operator to adjust the map scale while panning without affecting any of the radar settings such as MARPA and other range-sensitive settings.

FIG. 12 illustrates certain steps in an exemplary method 1200 of using the marine electronic device in accordance with the embodiment described in the previous paragraphs. The particular order of the steps illustrated in FIG. 12 and described herein can be altered without departing from the scope of the invention. For example, some of the illustrated steps may be reversed, combined, or even removed entirely. The method 1200 begins when the operator prompts the processing system 12 to cause the display 16 to display a map page in step 1202 and a radar overlay in step 1204. While viewing the map page with overlaid radar information, the operator may adjust the single scale/range control to adjust the map scale or the radar range as depicted in step 1206. Upon receiving a request to change the scale/range, the processing system determines whether the device 10 is in the position mode (vessel position marker is centered on display) as depicted in step 1208. If it is, the processing system simultaneously adjusts the map scale and radar range as depicted in step 1210. For example, if the operator operates the single scale/range control to increase the scale/range, both the map scale and the radar range are adjusted to the next highest scale/range. If the processing system determines that the device is not in the position mode in step 1208, the processing system only adjusts the map scale as depicted in step 1212. The processing system re-synchronizes the map scale to the radar range whenever leaving the panning mode.

Figure 13:
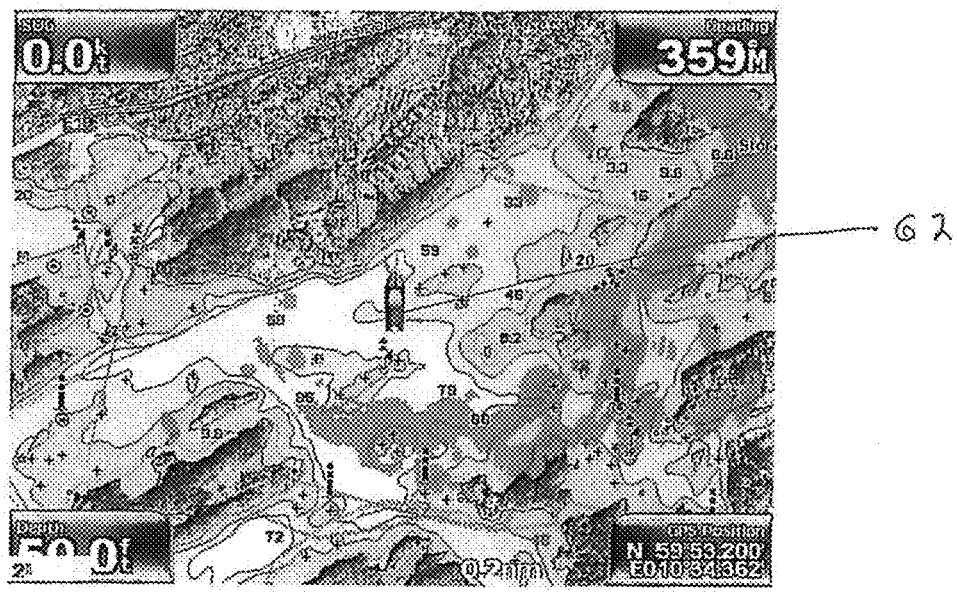
FIG. 13 is an exemplary screen display which may be shown by the marine electronic device.
Figure 14:
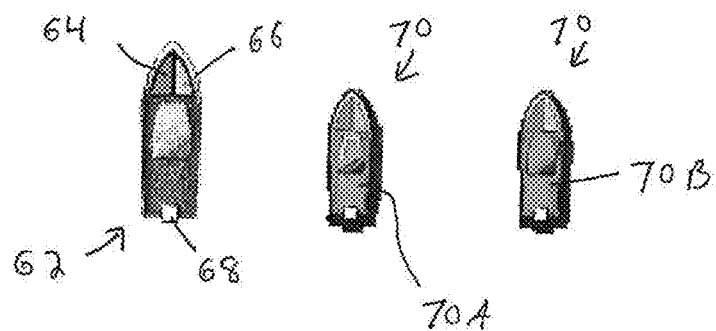
FIG. 14 illustrates exemplary marine vessel representations which may be displayed by the marine electronic device.

In another embodiment illustrated in FIGS. 13 and 14, the processing system 12 is operable for displaying an icon or other marker 62 shaped like a boat to mark the current position of the vessel in which the device 10 is used. The boat icon 62 includes red, green, and white colored portions in a manner consistent with the required lighting requirements of real vessels so that someone viewing the display may quickly determine the orientation of the vessel. For example, the boat icon may include a red segment 64 on the port/bow portion of the icon, a green segment 66 on the starboard/bow portion of the icon, and a white segment 68 on the rear portion of the icon.

Figure 18:
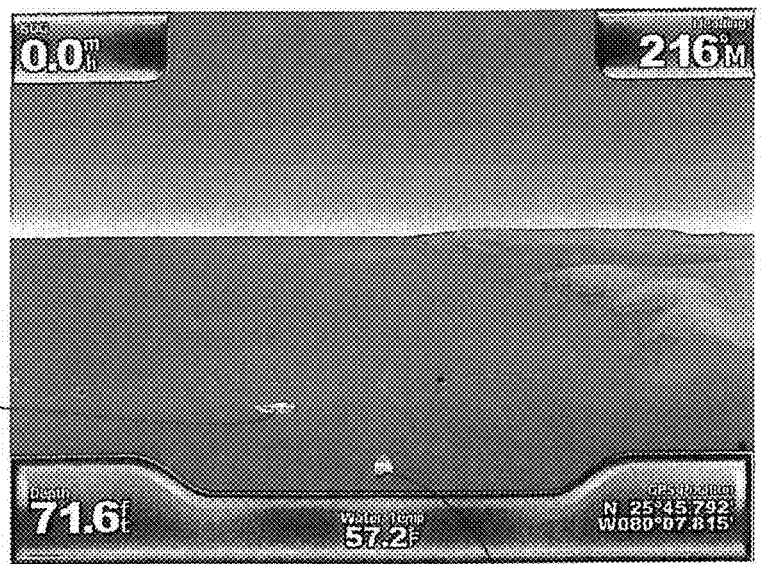
FIG. 18 is an exemplary screen display which may be shown by the marine electronic device.

A similar boat icon 70 shown in FIGS. 14 and 18 may also be displayed to indicate the current location of another vessel or vessels identified by radar or any other electronic method of tracking the position of other vessels. The red, green, and white portion of the icon 70 helps the operator of the vessel in which the marine electronic device 10 is used to determine the orientation of these other vessels by simply looking at the display.

In a related embodiment, a major portion of the boat icons 70 for the other vessels may be colored to indicate whether the other vessels are a potential collision threat with the vessel in which the marine electronic device is used. For example, as shown by the reference numeral 70B in FIG. 14, a major portion of the boat icon 70 for another vessel which is a collision threat (because it is too close to the vessel or is on an intercept trajectory with the vessel) may be colored red whereas a major portion of the boat icon 70 for another vessel which is not a collision threat may be colored green as shown by the reference numeral 70A. Other indicators may also be used to indicate collision threats. For example, the icon for a collision threat (such as an approaching vessel) may be accompanied by a blinking light, warning message, or the like.

Figure 15:
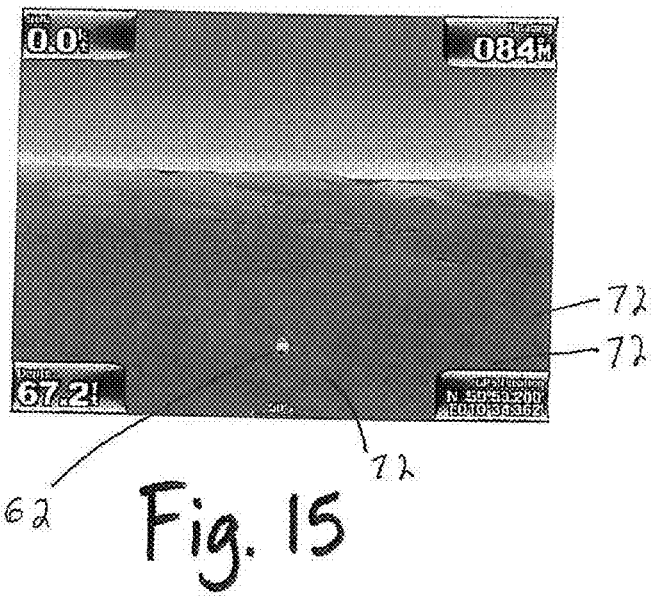
FIG. 15 is an exemplary screen display which may be shown by the marine electronic device.

In another embodiment, the processing system 12 is operable for displaying a three-dimensional map page and for displaying three-dimensional representations of certain auxiliary information on the map to make the map easier to read and interpret. For example, as illustrated in FIG. 15, the processing system 12 may cause the display 16 to display range rings 72 on the map page to more effectively place the boat icon 62 or other boat marker on the map. The range rings 72 concentrically encircle the boat icon 62 and extend out from the boat icon in a three-dimensional representation and therefore tie the boat icon to the water so the boat appears to be floating on the water rather than floating above the water. In embodiments, the range rings 72 are only placed over the portions of the display illustrating water to further tie the boat marker to the water surface.

Figure 16:
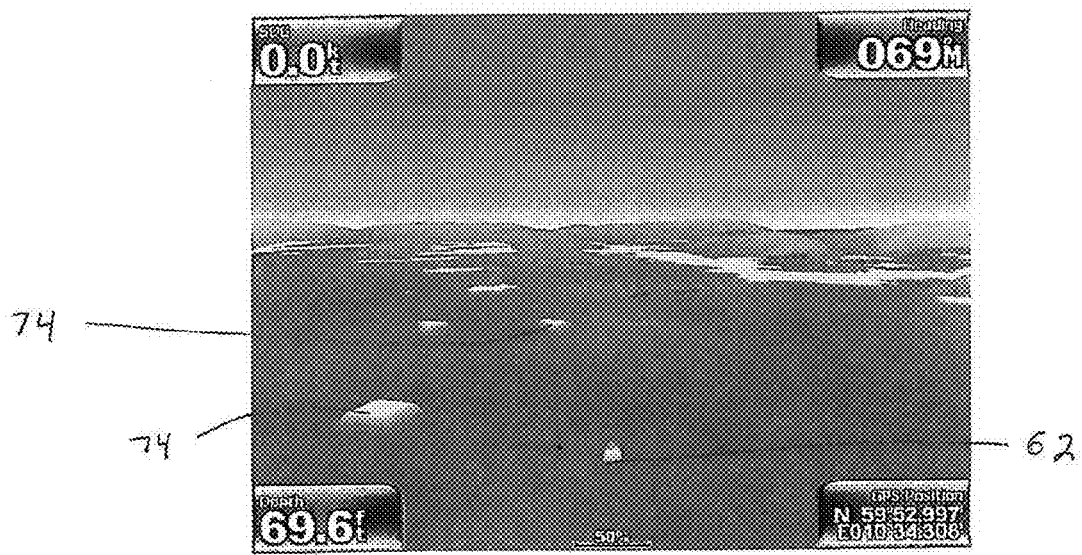
FIG. 16 is an exemplary screen display which may be shown by the marine electronic device.

The processing system 12 may also cause the display 16 to display three-dimensional representations of objects detected by marine surface radar such as land, other vessels, buoys, lights, docks, bridges, or the like, as depicted in FIG. 16.

Figure 17:
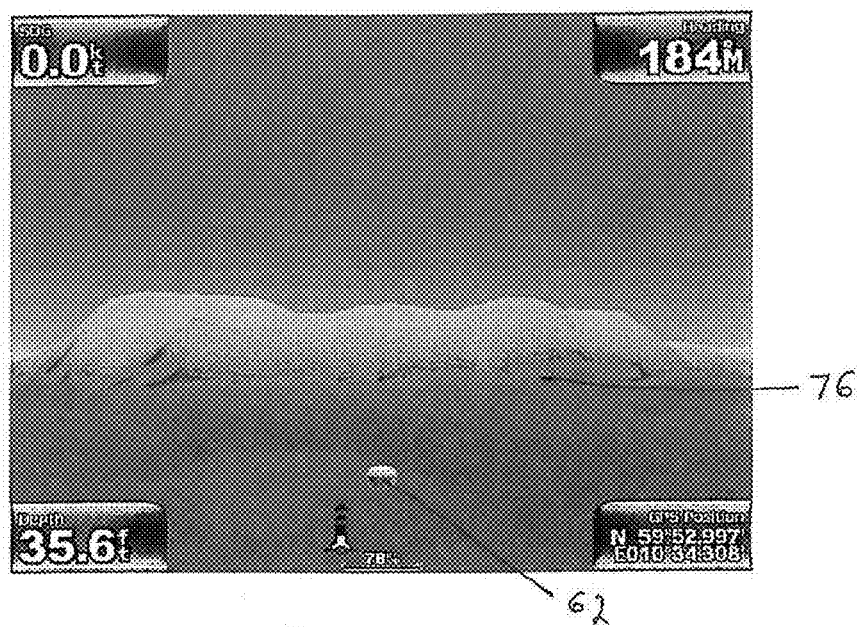
FIG. 17 is an exemplary screen display which may be shown by the marine electronic device.

For objects which are difficult to see due to their size or the scale of the map, the processing system 12 may cause the display 16 to display visual aids to emphasize the objects. For example, as illustrated in FIG. 17, the processing system 12 may cause the display 16 to display a red dot 76, blinking light, or other visual aid above buoys, lights, or other navigational aids. In one embodiment, the size of the visual aids may remain the same regardless of their distance from the camera so that the visual aids remain visible. In contrast, the navigational aid or other object marked by the visual aid may be shown to scale so that it becomes smaller when closer to the camera and bigger when farther away from the camera. Alternatively, both the visual aid and the navigational aid may be re-sized according to their distance from the camera. When re-sized, the visual aid and the navigational aid may have an upper limit size and a lower limit size so that they don't dominate the display when close to the camera or disappear entirely when far from the camera. The upper and lower size limits of the visual aids and navigational aids may be the same or independent from one another. For example, the visual aids may have a smaller upper limit size and a larger lower limit size than the navigational aids. The visual aids may also be configured to blink in the same pattern as the navigational aids which they mark. For example, a lighted buoy which is known to blink every one second (from Coast Guard provided data stored in the database) may be marked with a visual aid that also turns on and off at the same frequency.

The processing system 12 may also cause the display 16 to display three-dimensional location markers 70 for other vessels as depicted in FIG. 18, with the location markers for the other vessels indicating their direction of travel. For example, the location markers 70 for the other vessels may be colored red, green, and white as described above. The three-dimensional markers for the other vessels may be sized and shaped to indicate the size and shape of the vessels. For example, a relatively larger icon shaped like a large ship may be displayed for larger vessels and a smaller icon shaped like a ski boat may be displayed for smaller vessels. The type and size of the other vessels may be obtained with radar using MARPA or ARPA technology, or by AIS, or DSC technologies.

Figure 19:
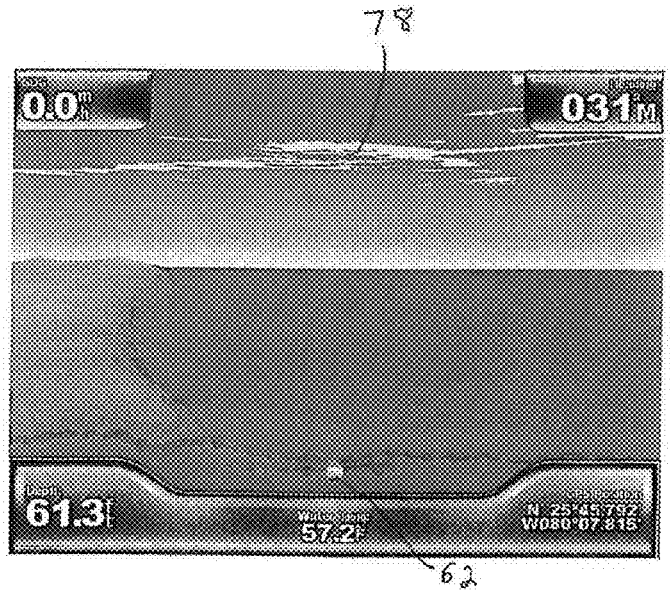
FIG. 19 is an exemplary screen display which may be shown by the marine electronic device.

The processing system 12 may also be configured to cause the display 16 to display three-dimensional representations 78 of real-time weather data obtained from the weather receiver 24 as depicted in FIG. 19. The real-time weather data may be NEXRAD radar data, water temperature data, wave height data, wave period data, wind direction data, and wind intensity data. The displayed weather data may also include three-dimensional representations of lightning strikes. The processing system 12 places the three-dimensional representations 78 of weather data on the map so as to simulate the actual position of clouds, lightning strikes, or the like, in the sky.

Figure 21:
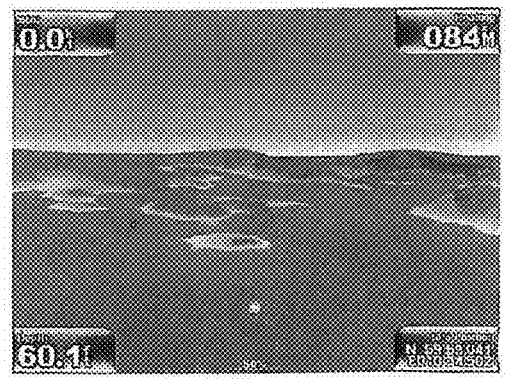
FIG. 21 is an exemplary screen display which may be shown by the marine electronic device.
Figure 22:
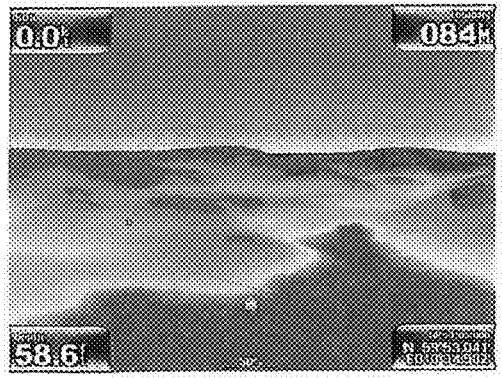
FIG. 22 is an exemplary screen display which may be shown by the marine electronic device.
Figure 20:
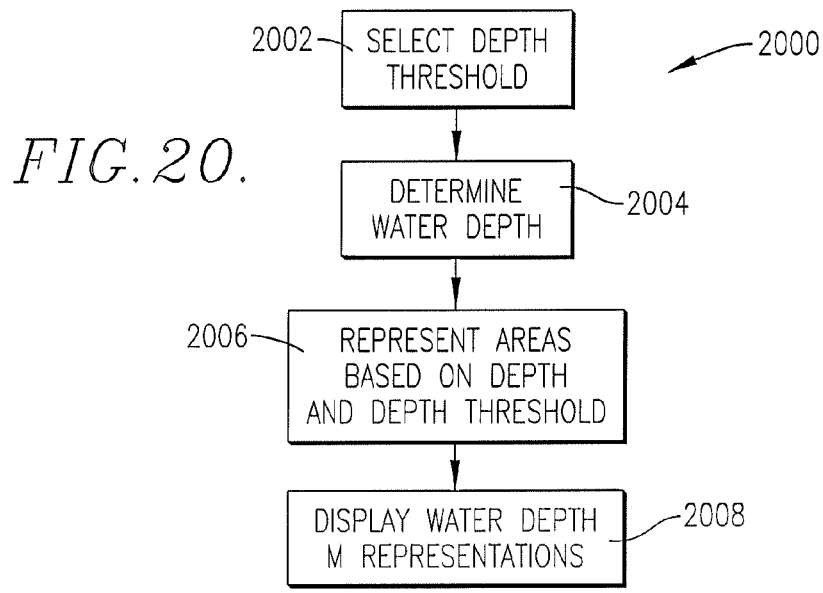
FIG. 20 is a flow diagram illustrating selected steps in a method of an embodiment.

In another embodiment illustrated in FIGS. 20 through 22, the processing system 12 is operable for displaying water depth representations on the map page so that the water depth at all locations on the display can be quickly ascertained. This may be done by coloring the water representations on the map page according to the depth of the water. For example, as shown in FIGS. 21 and 22, deep water may be shown in blue, and shallow water may be shown in red. Additional colors and color blends may be used to provide more detailed water depth data. For example, as illustrated in FIGS. 21 and 22, deep water may be shown in blue, intermediate depth water may be shown in green, relatively shallower water may be shown in yellow, and the shallowest water may be shown in red.

Additionally, the water depth representations may be based on a minimum safe water depth for the marine vessel in which the device 10 is used. For example, if the minimum safe depth for the vessel is 10 ft., all water that is deeper than 10 ft. may be shown in blue and all water shallower than 10 ft. may be shown in red. In other embodiments, multiple colors, or color blends, may be used to designate safe water depth ranges. For example, FIG. 21 shows a selected minimum safe water depth of 10 ft., wherein water that is deeper than 20 ft. is shown in blue, water that is between 10 ft. and 20 ft. deep is shown in a red-blue blend (green/yellow), and water that is shallower than 10 ft. is shown in red. FIG. 22 shows the current location marker for the vessel in the same water, but with a selected minimum safe water depth of 40 ft., where water that is deeper than 80 ft. is shown in blue, water that is between 40 ft. and 80 ft. deep is shown in green/yellow, and water shallower than 40 ft. is shown in solid red. The transition from one color to another may also be done smoothly (rather than in discrete steps) so that minor differences in water depth may be identified. For example, for a minimum safe depth of 10 ft., water that is shallower than 10 ft. may be shown in solid red, water that is deeper than 30 ft. may be shown in solid blue, and water depths between 10 ft. and 30 ft. may be shown in a red/blue blend, wherein the amount of each color in the blend varies proportionally with the water depth. In this example, a water depth of 11 ft. may be shown with a color blend of 95% red and 5% blue; a water depth of 20 ft. may be shown with a color blend of 50% red and 50% blue; and a water depth of 29 ft. may be shown with a color blend of 5% red and 95% blue. The particular colors and water depth ranges described and illustrated herein are merely examples of colors and ranges that may be used by the device 10. Any colors, number of colors, color blends, and water depth ranges may be used to represent water depth without departing from the scope of the invention.

FIG. 20 illustrates certain steps in an exemplary method 2000 of using the marine electronic device 10 in accordance with the embodiment described in the previous paragraphs. The method 2000 begins in step 2002 when an operator selects a minimum depth threshold for the vessel in which the device 10 is used. Alternatively, the minimum depth threshold may be retrieved by the processing system 12 from the vessel data stored in the database 42. The depth of the water currently represented on the map page is then determined in step 2004. This may be done by retrieving water depth information from cartographic data stored in the databases 42 or by actually measuring the water depth with the sonar transducer 20, sonar sounder 18, and processing system 12. The processing system 12 then represents the water and the water depth by coloring the display as depicted in step 2006 and as described above. The processing system then displays the colored water depth representations as depicted in step 2008 and as shown in FIGS. 21 and 22.

In another embodiment, the processing system 12 is operable for automatically determining an optimal vertical exaggeration factor for a map page. The vertical exaggeration factor determines how much the vertical axis of the map page should be exaggerated or magnified versus the horizontal axis. Vertical exaggeration essentially stretches objects in the vertical axis to make it easier to see the objects' shapes and positions. The processing system uses a variable exaggeration for each point on the terrain triangle mesh using two factors. The first is that elevation exaggeration for each point varies with distance from the elevation of the water surface. Elevations near the water surface are exaggerated less than elevations farther away from the water surface. The second is that points that fall within the water areas cannot have elevations greater than the water surface. The reason behind these two methods is to prevent water areas drawing at higher elevations than they should due to differences between elevation data and water area data.

Figure 24:
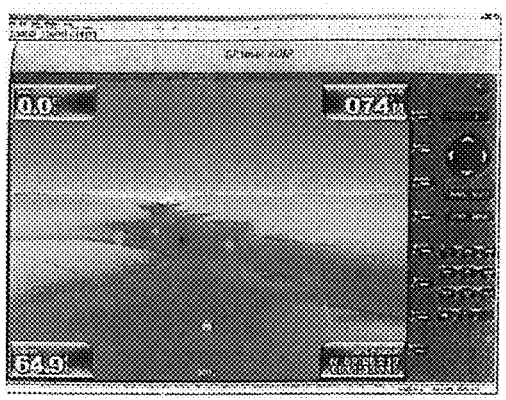
FIG. 24 is an exemplary screen display which may be shown by the marine electronic device.
Figure 25:
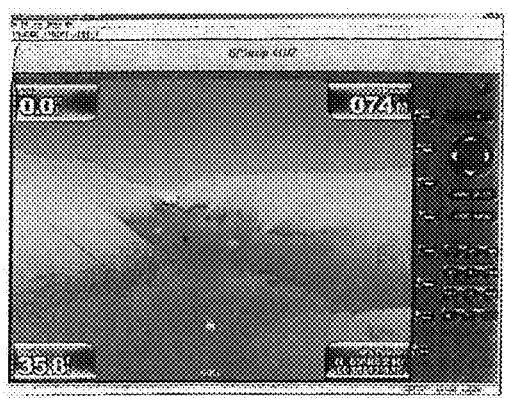
FIG. 25 is an exemplary screen display which may be shown by the marine electronic device.

The vertical exaggeration factor may be minimized or eliminated near the water's surface and then gradually increased above or below the water's surface. Thus, the vertical exaggeration is lowest (or turned off entirely) at points along the water surface and highest at the top and bottom of the map page. This de-emphasizes objects near the water line and emphasizes objects furthest from the water line. This minimizes the effect of data quantization for points near the surface of the water. If the data is exaggerated, water color begins to creep up on the hills and land color can dip down into the water making it hard to see where the plane of the water's surface resides. This technique preserves the integrity of the water surface plane without requiring more data storage. FIG. 24 shows a three-dimensional map page where vertical exaggeration does not change with elevation. FIG. 25. shows a three-dimensional map page where vertical exaggeration changes with elevation. FIG. 25 emphasizes the height of terrain without drawing water colors at incorrect locations. This technique can also be used to exaggerate terrain below the water surface in underwater map pages.

Terrain elevation data and data that describe the location of water areas forming bodies such as lakes, streams, and oceans can come from multiple sources. Errors in the elevation data can cause points in the data where water exists to have an elevation above the known elevation of the water. Drawing this data uncorrected causes water colors to be drawn above the water level. A technique for correcting these errors is to artificially limit terrain point elevations within water areas to the elevation of the water. This technique can be applied before or after elevation exaggeration and can be applied as a pre-processing step to the raw terrain elevation data before it is stored in the map data or at run-time when the terrain mesh is generated.

Figure 23:
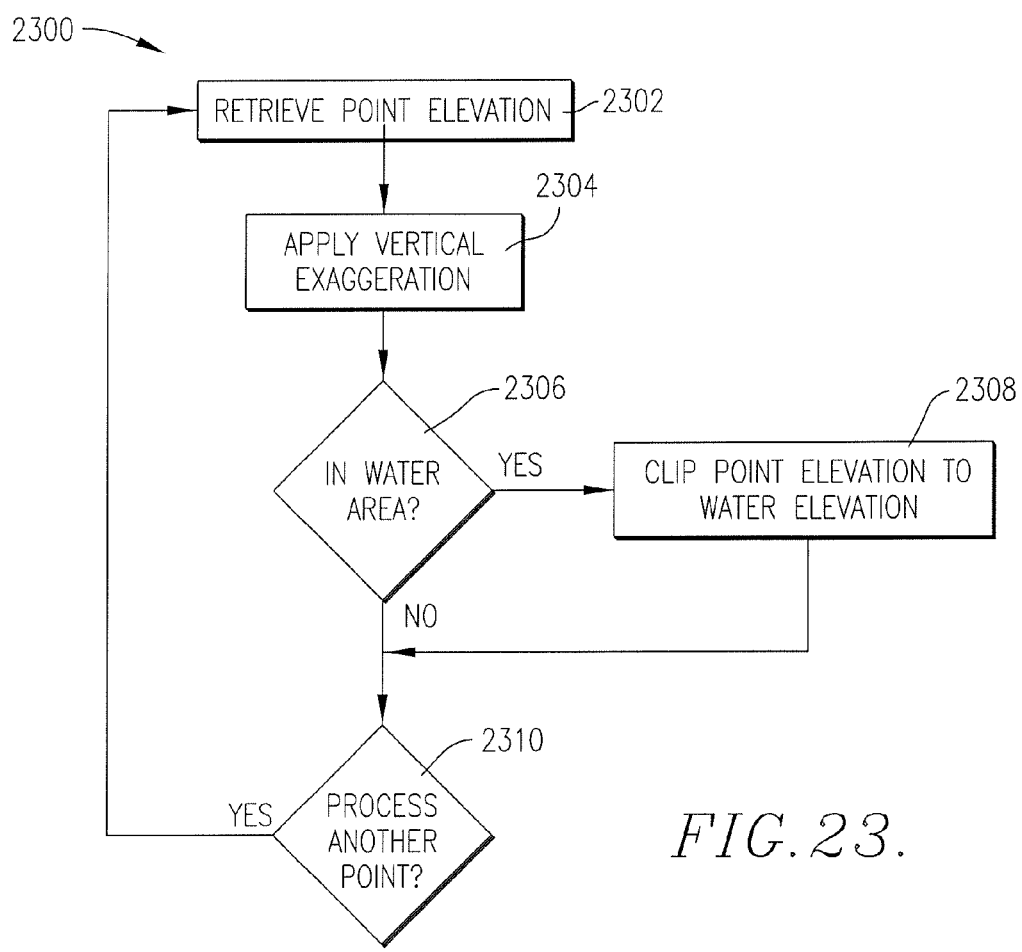
FIG. 23 is a flow diagram illustrating selected steps in a method of an embodiment.

FIG. 23 illustrates certain steps in an exemplary method 2300 of using the marine electronic device 10 in accordance with the embodiment described in the previous paragraphs. The method 2300 begins when the operator displays a map page on the display and the processing system begins the process of generating points on the terrain mesh. The processing system first retrieves the point's elevation from the terrain elevation data as depicted in step 2302. The processing system then applies the vertical exaggeration based on the point's elevation as depicted in step 2304. The processing determines whether this point lies within a water area as depicted in step 2306, and if it is, it clips the point's elevation to that of the known water elevation, as depicted in step 2308. This process is continued as long as there are more terrain mesh points to process, as depicted in step 2310

In another embodiment, the processing system 12 is operable for simultaneously adjusting camera position and camera angle in three-dimensional views. The camera position and camera angle may be smoothly adjusted in such a way as to maintain the position of the vessel marker in the same area in the display as described in more detail below. The user adjusts the camera apposition along the arc shown in FIGS. 26 and 27. The processing system then automatically adjusts the camera angle so that the point of focus (the vessel or the bottom under the boat) is always placed in the same area of the screen.

Figure 26:
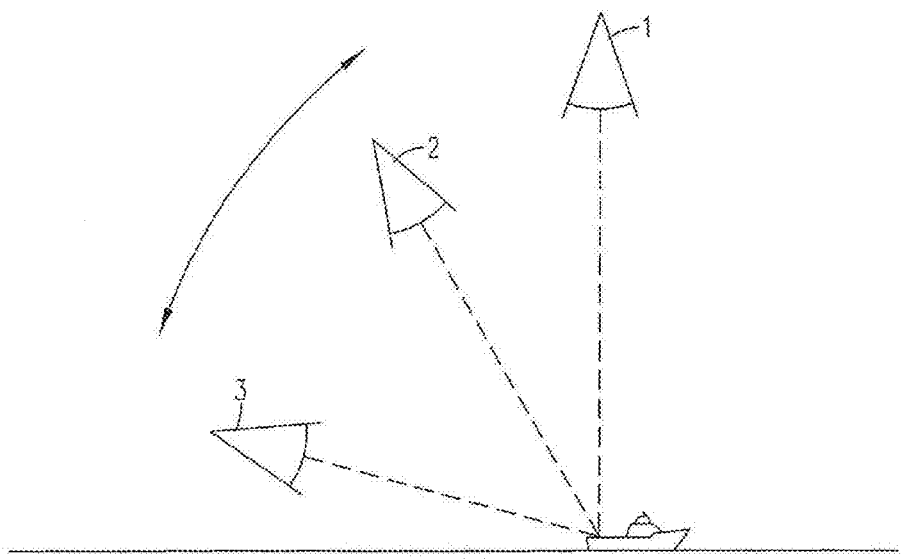
FIG. 26 is a schematic diagram illustrating a camera position and angle of the marine electronic device.
Figure 27:
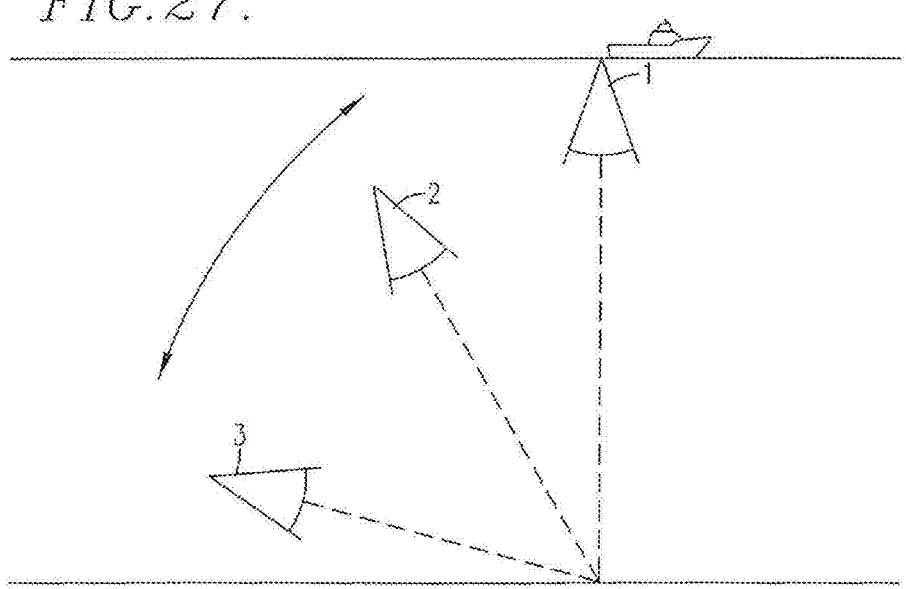
FIG. 27 is another schematic diagram illustrating a camera position and angle of the marine electronic device.
Figure 28:
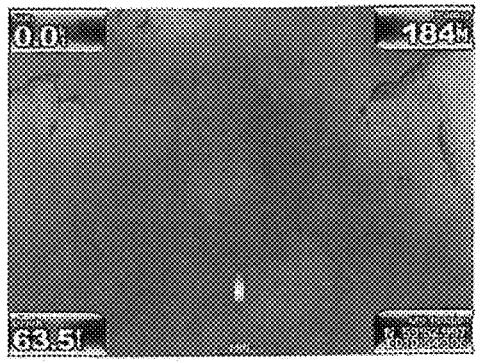
FIG. 28 is an exemplary screen display which may be shown by the marine electronic device.

FIG. 26 shows three different camera positions and camera angles for an aerial map page (above the vessel) and FIG. 27 shows three different camera positions and camera angles for an underwater map page (looking at an area on the water bottom below the vessel). Referring initially to FIG. 26, a first camera position and a first camera angle for the aerial view is identified by "1". The first camera position presents a generally overhead view of the displayed map. FIG. 28 shows an exemplary map page using the first camera position and camera angel.

The number "2" in FIG. 26 indicates the camera position and camera angle after a user requests to change the camera position. The user may provide the request by functioning an input, such as a button or switch, included with the user interface, by providing data through the user interface utilizing the memory and/or additional devices, by touching or pointing at the display, by issuing a voice command, or the like. The request may comprise a single request or a plurality of requests.

In various embodiments, the device 10 may automatically provide the camera position change request such that a user interaction or reception of the request is not necessarily required. For example, the processing system may automatically generate the request in response to a navigation event. The navigation event may correspond to a particular geographic location or area such that the processing system automatically generates the request when the device 10 approaches or enters the location or area. Additionally, the request may be provided by a combination of user input through the user interface and automatic generation by the processing system.

Figure 29:
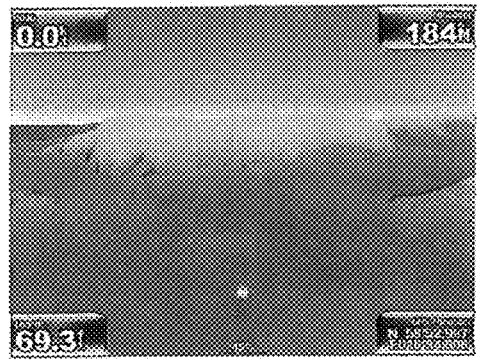
FIG. 29 is an exemplary screen display which may be shown by the marine electronic device.

After the request is received, the processing system displays the map utilizing the second camera position and the second camera angle. For example, a map page such as the one illustrated in FIG. 29 may be displayed.

In embodiments, the change in camera position and angle is not so substantial as to disorient or confuse the user by drastically changing the display. The intended effect is to gradually change the display such that the user may continue to identify objects presented on the display such as the current location marker for the vessel in which the device 10 is used, without confusion.

Figure 30:
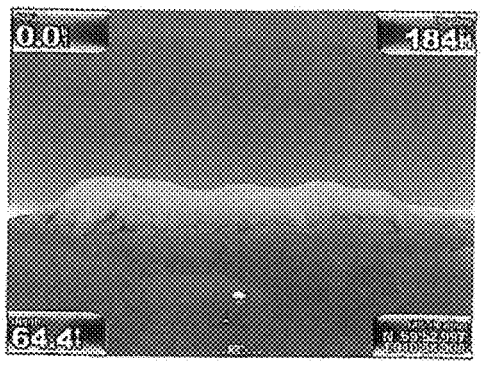
FIG. 30 is an exemplary screen display which may be shown by the marine electronic device.
Figure 31:
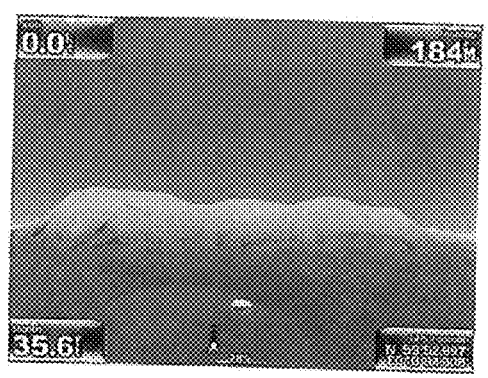
FIG. 31 is an exemplary screen display which may be shown by the marine electronic device.
Figure 32:
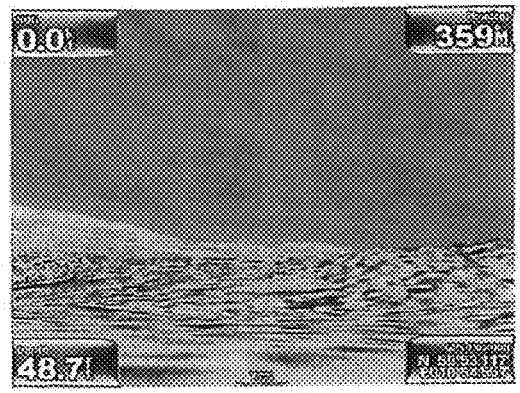
FIG. 32 is an exemplary screen display which may be shown by the marine electronic device.

A third, camera position and angle is identified by "3" in FIG. 26. This request may result in the display of a map page such as the one shown in FIG. 30. The device 10 may increase the camera position and angle utilizing any combinations, and need not be limited to the sequential combination of first, second, and third described above. For example, a map page with a fourth camera position and camera angle is shown in FIG. 31. Moreover, the steps described above may also be reversed, thereby performing the generally opposite function described above.

Figure 35:
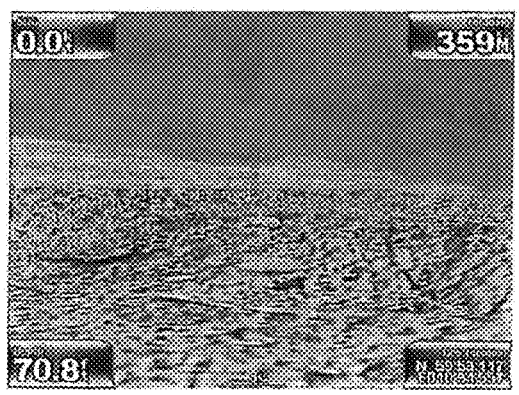
FIG. 35 is an exemplary screen display which may be shown by the marine electronic device.

FIG. 27 shows three different camera positions and angles for an underwater map page (looking at an area on the water bottom below the vessel), where a first camera position and first camera angle are identified by "1". FIG. 35 shows an exemplary map page with the first camera position and angle.

Figure 34:
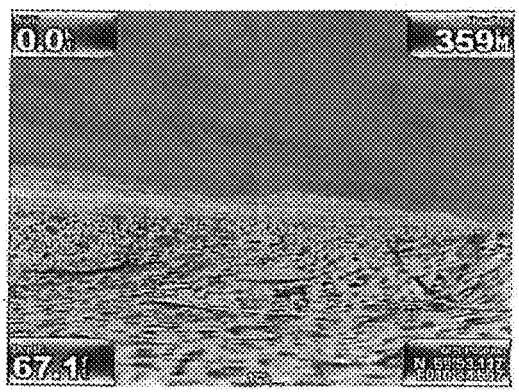
FIG. 34 is an exemplary screen display which may be shown by the marine electronic device.

"2" in FIG. 27 indicates the camera position and angle after a camera position request is received. The user may provide the request using any of the methods described above. After the request is received, the processing system displays the underwater map utilizing the second camera position and angle. For example, a map page such as the one illustrated in FIG. 34 may be displayed.

Figure 33:
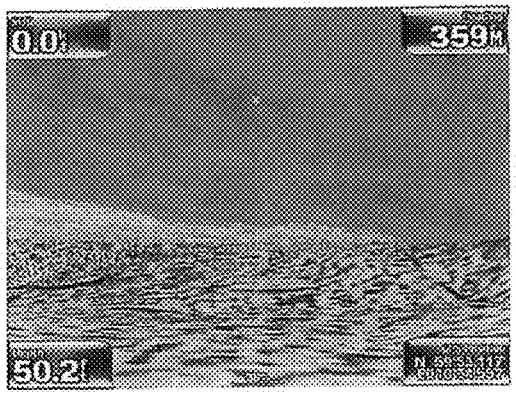
FIG. 33 is an exemplary screen display which may be shown by the marine electronic device.

A third camera position and camera angle is identified by "3" in FIG. 27. This request may result in the display of a map page such as the one shown in FIG. 33.

As with the aerial view, the device 10 may increase the camera position of the underwater view utilizing any combinations, and need not be limited to the sequential combination of first, second, and third camera positions and angles described above. For example, a fourth camera position and camera angle may correspond to a map page such as the one shown in FIG. 31. The steps described above for the underwater view may also be reversed, thereby performing the generally opposite function described above.

The processing system also provides a unique point scaling technique. Prior art chartplotters draw points like buoys and wrecks so that they do not get smaller the farther away they are from the camera (perspective is not applied). The present invention has two techniques for determining point drawing size that varies with camera position. When the camera is at its lowest position (directly behind the boat looking forward), points are drawn so that they do get smaller the farther they are from the camera when the camera is at its lowest position. Furthermore, the processing system limits the maximum size that the points are drawn as. For example, as a buoy approaches from the distance it will gradually get larger the closer it gets to the camera. Instead of eventually being drawn very large and filling the screen if it is very close to the camera, as what would happen with normal perspective, the point will be drawn at a maximum size when it reaches a certain distance from the camera. This naturally reduces the clutter of points and gives emphasis to the most important points close to the vessel. When the camera is at its highest position (directly above the boat looking down), points are drawn so that they are all the same size—the points are not scaled for size with distance from the camera. This camera position gives an overview of the area surrounding the vessel. As the camera position moves from one position extreme to the other, the point scaling smoothly interpolates between the two methods.

In another embodiment, the processing system 12 is operable for receiving two-dimensional sonar data from the sonar sounder 18 and sonar transducer 20 and for realistically rendering it on a three-dimensional map page. The transducer sends sound waves down into the water in a cone shape, similar to a flashlight beam (covering a smaller circular area at the top and angling out to a larger circular area at the bottom). These sound waves reflect off of any object that they hit, and then the waves travel back up to the transducer. These objects could be fish, branches, the bottom, or any other object that has a density that is different from the water. The transducer receives the sound wave information, and then sends the information to the sounder module, which in turn sends the information to the processing system. The processing system then displays the information on the display.

Sonar information is typically displayed in a panel on a two-dimensional display. The sonar panel may be any number of pixels or columns wide and any number of pixels or rows tall, depending on the beam-width of the transducer and resolution of the display. The coloring or shading of pixels within the panel indicate reflections from objects such as fish, the bottom of the water, or the like. For example, red pixels at the top of the panel may be from surface clutter, red pixels at the bottom of the panel may indicate the water bottom, and colored pixels between the top and bottom of the panel may represent fish.

Figure 36:
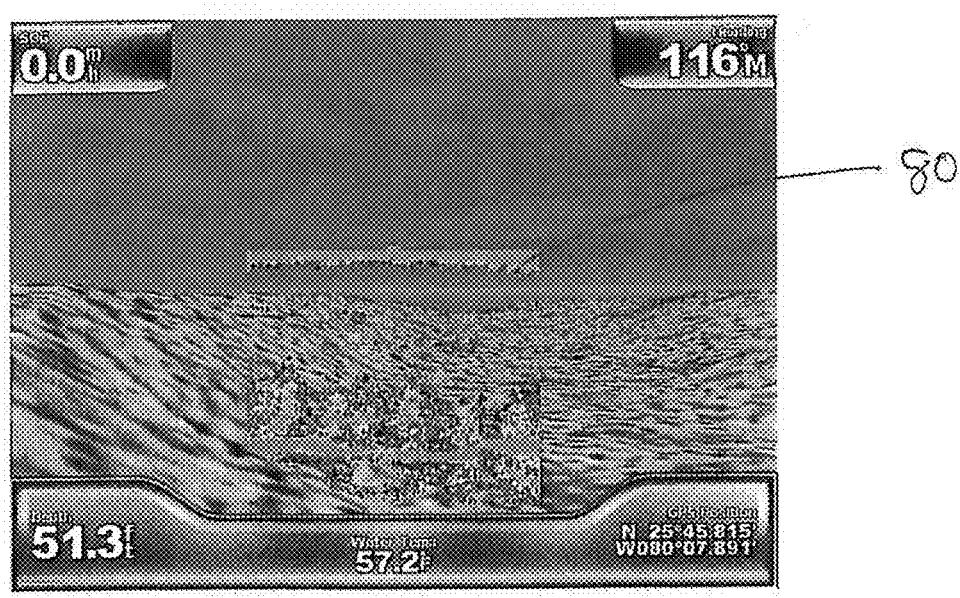
FIG. 36 is an exemplary screen display which may be shown by the marine electronic device.

In accordance with an embodiment of the device 10, the processing system 12 accurately positions one or more two-dimensional sonar panels 80 on a three-dimensional underwater map page as shown in FIG. 36 so operators can more easily and intuitively determine the locations of objects shown in the sonar panels. The processing system 12 accomplishes this by receiving from the sonar transducer 20 and sounder 18 sonar information which makes up a conventional sonar panel. The processing system then polls the location determining component 14 or otherwise determines the current location of the vessel and associates the sonar panel with the current location. The processing system 12 then displays a three-dimensional underwater map and positions the sonar panel 80 on the map so that it appears on the map near the location where it was created. The two-dimensional sonar panel 80 may be positioned by placing the center of the panel at the position of the vessel when the sonar panel was acquired. The processing system 12 may also vertically scale the two-dimensional sonar panel by setting the average bottom depth represented by the sonar panel to equal the actual average depth of the water at the location where the sonar panel was created. This positions the bottom of the sonar panel at or near the bottom of the three-dimensional map page rather than suspending it above or positioning it below the bottom of the water.

Figure 37:
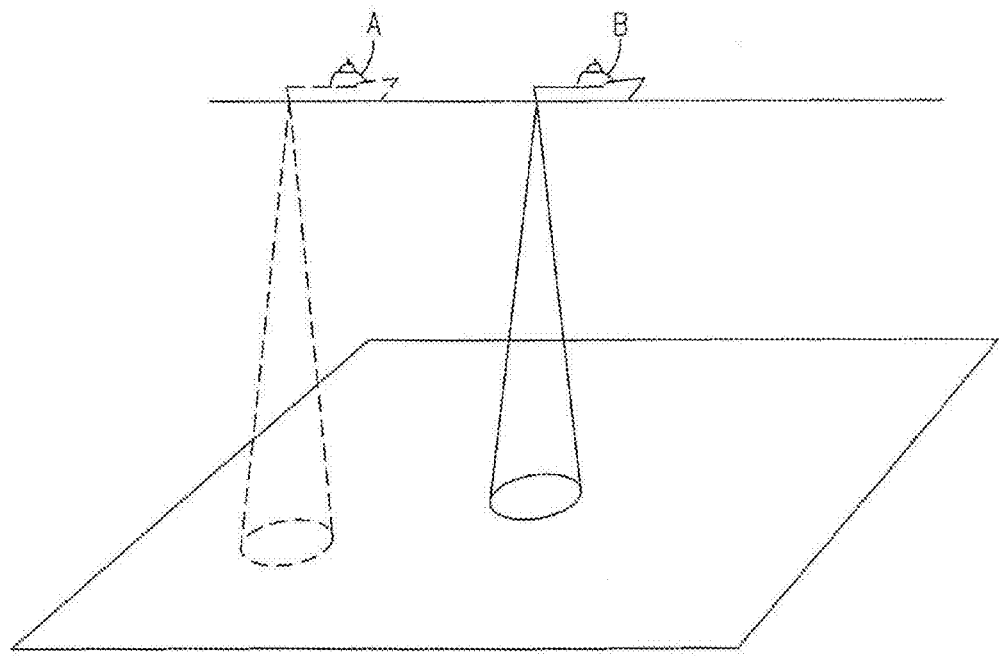
FIG. 37 is a schematic diagram illustrating a sonar feature of the marine electronic device.
Figure 38:
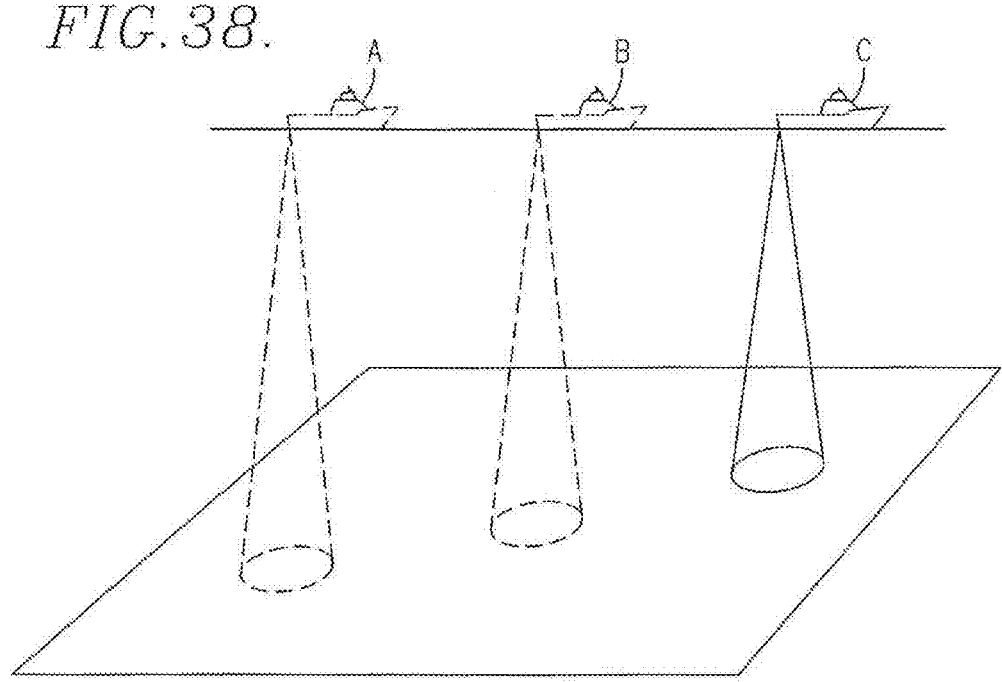
FIG. 38 is another schematic diagram illustrating the sonar feature of the marine electronic device.

As the vessel moves, the processing system 12 may acquire additional sonar panels and associate each of them with the location of the vessel at the time the information in the sonar panel was acquired. For example, as illustrated in FIG. 37, a sonar sounder 18 and sonar transducer 20 may acquire a first sonar panel when the vessel is positioned at location "A" and another sonar panel when the vessel moves to location "B". Then, as illustrated in FIG. 38, a third sonar panel may be acquired when the vessel moves to position "C". The processing system 12 may then cause the display 16 to display all of these two-dimensional sonar panels on the display, with each sonar panel being positioned on the three-dimensional map at or near the position where the information for the sonar panel was acquired. The processing system 12 may be configured to acquire and cause the display 16 to display sonar panels at pre-determined time intervals (for example, every 5, 10, 30 or 60 seconds) or whenever the vessel moves a pre-determined distance (for example 10, 50, or 100 ft.). The processing system may also replace a previously acquired sonar panel with a more recently acquired panel whenever the vessel travels back over the same spot or area in which the previously acquired panel was created.

In another embodiment depicted in FIGS. 39 and 40, the processing system 12 is operable for creating a guard zone 82 around the vessel and providing an alert when threats (e.g. other boats, buoys, docks, obstructions, etc.) enter or approach the guard zone. Importantly, the guard zone 82 can be customized to account for nearby objects which are not currently a threat to the vessel to reduce false alarms and to shift processing power to possible real threats.

Marine surface radar may be used to detect both moving and stationary objects which represent the potential for hazardous collisions. The threat of collision is present both when a vessel is underway and at anchor in open water. Unfortunately, the two most common methods of detecting threats for recreational boating are difficult to set up and require a good understanding of the manner in which surface radars operate.

The most common approach is the "guard zone" approach. This approach allows an operator to establish a closed geometric shape around the vessel's position. Any radar echoes from objects which are sensed to be within the bounds of the shape generate an alarm condition. The simplest form of guard zone is a circle around the vessel's current position. The biggest challenge with a circle lies in the transmit clutter generated by radar. This clutter will always reside within the bounds of a simple circle guard zone and will therefore cause false alarms. This is particularly problematic when the radar is zoomed to closer ranges where the transmit clutter is quite dominant relative to the transmit range.

A guard zone comprised of the area between two concentric circles (a doughnut) with the space between the two circles being the alarm area solves the transmit clutter problems mentioned above. A doughnut-shaped guard zone permits the operator to manually change the radius of both the inner and outer circles to exclude transmit clutter and set an appropriate alarm zone.

Although a doughnut-shaped guard zone is superior to a simple circle guard zone, neither approach works well for a vessel at anchor. It is not uncommon for a vessel to anchor near shore, buoys, other anchored boats, or the like, which may be within the preferred safety zone but which are not a threat because they are stationary. In an attempt to solve some of these problems, complex interfaces have been developed to allow an operator to create a "gap" in the guard zone which can be excluded from the guard zone. Unfortunately, these interfaces are complex and difficult to use.

Even more complex systems use ARPA (Automatic Radar Plotting Aid). These technologies identify threat targets automatically and generate an alarm if the target is expected to cross within a simple circular safety zone around a vessel within some user-defined time. While this represents the best in automatic operation, ARPA systems are very expensive and require special hardware and complex target identification algorithms to operate effectively. Recreational systems employ a technology called MARPA, or "Mini" version of ARPA. The technology is identical in operation to ARPA except that the user chooses the targets which the device is expected to track and potentially generate alarms for. While MARPA doesn't have as stringent hardware requirements as ARPA, it still requires an optional electronic heading sensor and requires user interaction to be effective. Obviously MARPA cannot be relied upon when at anchor and the captain is away from the helm or navigation station for long periods of time.

The device 10 of the present invention solves many of these problems by creating a guard zone 82 with exclusion areas to account for guard zone noise and stationary objects. First, a doughnut-shaped guard zone is divided into a number of wedges. Any number of wedges may be created: a large number of small wedges will increase precision, a small number of large wedges will increase device performance Transmit clutter boundaries are then determined using the same methods used for determining sonar surface clutter. An inner radius of all the wedges is then extended outward until it is beyond the transmit clutter.

The wedges are then each customized to account for stationary and/or non-threatening objects. If a radar echo which is not identified as transmit clutter exists in a wedge, the outer alarm radius for the wedge is moved inward past the echo or the inner alarm radius for the wedge is moved outward past the echo. These steps are repeated until all the wedges are customized with their own inner and outer boundaries which exclude radar echoes which were detected when the guard zone was created. Radar echoes within the safety ring may also be filtered to minimize false alarms due to sporadic changes in echo size/shape. Objects which are excluded from a wedge during the guard zone set-up but which later begin to move will trigger an alarm if the objects cross over a wedge boundary or enter another wedge. The processing system may periodically re-evaluate the wedge boundaries so that objects moving away from the vessel will allow the wedge they reside in to eventually enlarge their full extent as defined by the user.

FIG. 39 illustrates an exemplary guard zone 82 created for a vessel 62 anchored near a shore. For this example, four guard zone wedges 84, 86, 88, 90 are created, all with inner boundaries spaced far enough from the vessel to exclude transmit clutter. To customize the wedges to exclude stationary objects detected by radar, the outer boundary of the wedge 84 is pulled in toward the vessel to account for a stationary boat 92, the inner boundaries of the wedges 86 and 88 are pushed out further away from the boat to account for a buoy 84, and the outer boundary of the wedge 90 is pulled in to account for another anchored boat 96. If either boat 92 or 96 later begins to move, it will trigger an alarm if the boat crosses the outer boundary of the wedge proximate to it or if it crosses into another wedge.

FIG. 40 illustrates another exemplary guard zone 98 created for a vessel 62 anchored away from the shore. The guard zone 98 is similar to the guard zone 82 of FIG. 39 except that it includes wedges 100, 102, 104, 106, 108, 110, 112 all the way around the vessel. In this example, the inner boundaries of the wedges 104 and 110 are pushed out to account for buoys 114, 116 or other objects and the outer boundaries of the wedges 100 and 108 are pulled in to account for buoys 118, 120 and a nearby anchored boat 122, respectively.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A marine electronic device for use in a marine vessel, comprising:
  a display;
  a memory including cartographic data, the cartographic data including navigational aids for boaters;
  a location determining component for detecting locations of the marine vessel; and
  a processing system coupled with the display, memory and the location determining component, the processing system operable to:
    cause the display to display a marine map including a navigational aid and a boat icon overlaid on the map at a first camera position,
    calculate a distance from the navigational aid to the detected location of the marine vessel, and
  adjust the scale of the navigational aid based on the calculated distance;
wherein the size of the adjusted navigational aid has an upper limit size and a lower limit size;
  wherein the displayed navigational aid gradually becomes larger as the calculated distance decreases; and
wherein the processing system is further operable to cause the display to display the marine map including the navigational aid and the boat icon overlaid on the map at a second camera position, wherein the scale of the navigational aid smoothly interpolates between the transition from the first camera position to the second camera position.

2. The marine electronic device as set forth in claim 1, wherein the navigational aids include buoys, markers and lights.

3. The marine electronic device as set forth in claim 1, wherein the navigational aid is displayed at its upper limit size when the calculated distance is less than a minimum distance.

4. The marine electronic device as set forth in claim 1, wherein the displayed navigational aid gradually becomes smaller as the calculated distance increases.

5. The marine electronic device as set forth in claim 1, wherein the processing system is further operable to cause the display to display the marine map including the navigational aid and the boat icon overlaid on the map at a third camera position, wherein the navigational aids are not scaled for size to provide an overview of the area surrounding the marine vessel.

6. The marine electronic device as set forth in claim 1, wherein the processing system is further operable to display visual aids to emphasize the navigational aids.

7. The marine electronic device as set forth in claim 1, wherein the visual aid is one of a blinking light displayed over the navigational aid.

8. The marine electronic device as set forth in claim 7, wherein the visual aid blinks in the same pattern as the navigational aids which it marks.

9. The marine electronic device as set forth in claim 1, wherein the navigational aid is displayed at its lower limit size when the calculated distance is greater than a maximum distance.

* * * * *